United States Patent
Suzuki et al.

(10) Patent No.: US 11,397,435 B2
(45) Date of Patent: Jul. 26, 2022

(54) AUTOMATIC DRIVING VEHICLE AND PROGRAM FOR AUTOMATIC DRIVING VEHICLE

(71) Applicant: MICOLATTA INC., Tokyo (JP)

(72) Inventors: Masahiro Suzuki, Tokyo (JP); Yoichiro Sako, Tokyo (JP)

(73) Assignee: MICOLATTA INC., Tokyo (JP)

( * ) Notice: Subject to any disclaimer, the term of this patent is extended or adjusted under 35 U.S.C. 154(b) by 309 days.

(21) Appl. No.: 16/848,387

(22) Filed: Apr. 14, 2020

(65) Prior Publication Data

US 2020/0241532 A1    Jul. 30, 2020

Related U.S. Application Data

(63) Continuation of application No. 16/157,797, filed on Oct. 11, 2018, now Pat. No. 10,656,648, which is a
(Continued)

(30) Foreign Application Priority Data

Apr. 30, 2014   (JP) .................................. 2014-093515

(51) Int. Cl.
*G05D 1/00*     (2006.01)
*G08G 1/00*     (2006.01)
(Continued)

(52) U.S. Cl.
CPC ........... *G05D 1/0088* (2013.01); *B60K 35/00* (2013.01); *B60N 2/002* (2013.01); *B60R 25/23* (2013.01);
(Continued)

(58) Field of Classification Search
CPC ...... G05D 1/0088; B60K 35/00; B60N 2/002; B60R 25/23; B60R 25/25; G01C 21/3407;
(Continued)

(56) References Cited

U.S. PATENT DOCUMENTS

| | | |
|---|---|---|
| 6,275,231 B1 | 8/2001 | Obradovich |
| 6,992,583 B2 | 1/2006 | Muramatsu |

(Continued)

FOREIGN PATENT DOCUMENTS

| | | |
|---|---|---|
| JP | 2001-288940 | 10/2001 |
| JP | 2002-505219 | 2/2002 |

(Continued)

OTHER PUBLICATIONS

Ogai, "Kitakyushu-Shi ni Okeru Jido Unten no Jissho Jikken-Koreisha-yo Kogata Denki Jidosha no Jiritsu Soko Jikken-", Sep. 27, 2012, pp. 3, 31, 53 [online],URL:http://web.archive.org/web/20130123173244/gttp://www.isit.or.jp/wg2/files/2012/08/20120927_ISIT_Ogai.pdf>.

(Continued)

*Primary Examiner* — Michael V Kerrigan
(74) *Attorney, Agent, or Firm* — Greenblum & Bernstein, P.L.C.

(57) ABSTRACT

An automatic driving vehicle includes an automatic driving mode in which autonomous traveling is carried out. The automatic driving vehicle receives information for estimating a setup for a destination and a time. The information is input by a driver or a user when the driver or the user gets out of the automatic driving vehicle. The automatic driving vehicle is controlled to move to the destination on a basis of the destination and the time.

31 Claims, 15 Drawing Sheets

EXAMPLE OF STORED CONTENT IN AFTER-GETTING-OUT BEHAVIOR STORING UNIT

1. MOVEMENT TO PRESCRIBED PARKING PLACE
   1-1 HOME PARKING PLACE
   1-2 COMPANY PARKING PLACE
   1-3 CONTRACTED PARKING PLACE
2. WAIT AT NEIGHBORING PARKING PLACE UNTIL CALLED
3. WAIT HERE
4. GO TO SPOT A
   SPOT A
5. GO TO PICK UP IN RESPONCE TO CALLING
6. WAIT AT SPOT B
   SPOT B
7. RETURN TO GETTING-OFF LOCATION AFTER PREDETERMINED TIME
8. STAY AT SPOT C AFTER PREDETERMINED TIME
   SPOT C

Related U.S. Application Data continuation of application No. 15/305,254, filed as application No. PCT/JP2015/061697 on Apr. 16, 2015, now Pat. No. 10,139,824.

(51) Int. Cl.
| | | |
|---|---|---|
| *G08G 1/123* | (2006.01) | |
| *G01C 21/34* | (2006.01) | |
| *B60K 35/00* | (2006.01) | |
| *B60N 2/00* | (2006.01) | |
| *B60R 25/23* | (2013.01) | |
| *B60R 25/25* | (2013.01) | |
| *G06Q 30/02* | (2012.01) | |
| *G06Q 30/06* | (2012.01) | |

(52) U.S. Cl.
CPC .......... *B60R 25/25* (2013.01); *G01C 21/3407* (2013.01); *G01C 21/3438* (2013.01); *G06Q 30/0284* (2013.01); *G06Q 30/0645* (2013.01); *G08G 1/00* (2013.01); *G08G 1/123* (2013.01)

(58) Field of Classification Search
CPC .......... G01C 21/3438; G06Q 30/0284; G06Q 30/0645; G08G 1/00; G08G 1/123
See application file for complete search history.

(56) References Cited

U.S. PATENT DOCUMENTS

| | | |
|---|---|---|
| 9,082,239 B2 | 7/2015 | Ricci |
| 9,317,033 B2 | 4/2016 | Ibanez-Guzman et al. |
| 9,511,765 B2 | 12/2016 | Obradovich |
| 9,545,930 B2 | 1/2017 | Ricci |
| 2002/0054159 A1 | 5/2002 | Obradovich |
| 2002/0121962 A1 | 9/2002 | Wolfe |
| 2003/0164778 A1 | 9/2003 | Muramatsu |
| 2008/0027599 A1 | 1/2008 | Logan et al. |
| 2014/0032048 A1 | 1/2014 | Obradovich |
| 2015/0149263 A1 | 5/2015 | Stenneth et al. |
| 2015/0166009 A1 | 6/2015 | Outwater et al. |
| 2015/0185034 A1 | 7/2015 | Anker |
| 2015/0199619 A1 | 7/2015 | Ichinose et al. |
| 2015/0219464 A1* | 8/2015 | Beaurepaire ....... G01C 21/3617 701/538 |
| 2015/0233719 A1 | 8/2015 | Cudak et al. |
| 2015/0241225 A1 | 8/2015 | Liu et al. |

FOREIGN PATENT DOCUMENTS

| | | |
|---|---|---|
| JP | 2003-259420 | 9/2003 |
| JP | 2006-302187 | 11/2006 |
| JP | 2009-271631 | 11/2009 |
| JP | 2012-048563 | 3/2012 |
| WO | 2014/024254 | 2/2014 |

OTHER PUBLICATIONS

"ISIT Dai 12 Kai Car Electronics Kenkyukai Koen Gaiyo", Institute of Systems, Information Techologies and Nanotechnologies, Sep. 27, 2012, PP. <URL:http://www.car-electronics.jp/files/2012/09/car-ele_12th.pdf>.

Written Opinion issued in International Patent Application No. PCT/JP2015/061697, dated Jul. 21, 2015.

* cited by examiner

EXAMPLE OF STORED CONTENT IN
AFTER-GETTING-OUT BEHAVIOR STORING UNIT

1. MOVEMENT TO PRESCRIBED PARKING PLACE
    1-1 HOME PARKING PLACE
    1-2 COMPANY PARKING PLACE
    1-3 CONTRACTED PARKING PLACE
2. WAIT AT NEIGHBORING PARKING PLACE UNTIL CALLED
3. WAIT HERE
4. GO TO SPOT A

| SPOT A |

5. GO TO PICK UP IN RESPONCE TO CALLING
6. WAIT AT SPOT B

| SPOT B |

7. RETURN TO GETTING-OFF LOCATION
   AFTER PREDETERMINED TIME
8. STAY AT SPOT C
   AFTER PREDETERMINED TIME

| SPOT C |

FIG. 2

AUTOMATIC DRIVING VEHICLE AND PROGRAM FOR AUTOMATIC DRIVING VEHICLE

CROSS REFERENCE TO RELATED APPLICATIONS

This is a continuation of U.S. patent application Ser. No. 16/157,797, filed Oct. 11, 2018, which is a continuation of U.S. patent application Ser. No. 15/305,254, filed Oct. 19, 2016, and now U.S. Pat. No. 10,139,824, which is a National Stage Entry of PCT/JP2015/061697, filed Apr. 16, 2015, which claims priority from Japanese Patent Application No. 2014-093515, filed Apr. 30, 2014. The disclosures of all of these documents, including the specifications, drawings, and claims, are incorporated herein by reference in their entireties.

TECHNICAL FIELD OF THE INVENTION

The present invention relates to an automatic driving vehicle and a program for an automatic driving vehicle.

BACKGROUND ART OF THE INVENTION

There is proposed an automatic driving vehicle capable of autonomous traveling without a driving operation by a driver. Further, various kinds of inventions using characteristics of such an automatic driving vehicle have been proposed. For example, in Patent Document 1 (JP2012-48563-A), an automatic driving vehicle that is configured to designate and move to, by storing schedule information containing a time and a place (destination) designated by a user in advance in the automatic driving vehicle, the destination for automatic driving on the basis of the schedule information is proposed.

For example, the automatic driving vehicle is configured so that after a user A gets out from the automatic driving vehicle, a place where the user A starts to use the automatic driving vehicle next time is estimated on the basis of the stored schedule information, the automatic driving vehicle waits at the place if the estimated place is a current location, and the automatic driving vehicle moves to the estimated place and wait there if the estimated place is different from the current location.

PRIOR ART DOCUMENTS

Patent Documents

Patent document 1: JP2012-48563-A

SUMMARY OF THE INVENTION

Problems to be Solved by the Invention

However, in Patent document 1 described above, the user is required to register and store schedule information, which contains at least designation of date and time, and a place, in the automatic driving vehicle in advance. This is burdensome. In addition, there is a problem that it is impossible for a user who actually gets in the automatic driving vehicle to provide an instruction to the automatic driving vehicle as occasion may demand in accordance with an action mode and/or an action objective after getting out from the automatic driving vehicle.

It is an object of this invention to provide an automatic driving vehicle capable of solving the problem described above.

Means for Solving the Problems

In order to solve the problem described above, the present invention provides an automatic driving vehicle having an automatic driving mode in which autonomous traveling is carried out, the automatic driving vehicle including: behavior setup receiving means configured to receive a setup for a behavior after getting out from the automatic driving vehicle, the setup being to be inputted when a driver or passenger gets out from the automatic driving vehicle; and control means configured to control conduct of the behavior on the basis of the setup.

According to the invention provided with the above configuration, a driver or passenger can set up a behavior thereof after getting off from an automatic driving vehicle when the driver or passenger gets out from the automatic driving vehicle.

Effect According to the Invention

According to the automatic driving vehicle of this invention, a user who is getting in an automatic driving vehicle can give an instruction to the automatic driving vehicle when to get out from the automatic driving vehicle as occasion may demand in accordance with his or her action mode and/or action objective after getting out from the automatic driving vehicle.

BRIEF EXPLANATION OF THE DRAWINGS

FIG. 2 is a view showing an example of stored content in an after-getting-out behavior storing unit used in the embodiment of the automatic driving vehicle according to this invention.

EMBODIMENTS FOR CARRYING OUT THE INVENTION

Hereinafter, an automatic driving vehicle according to an embodiment of this invention will be described with reference to the drawings.

Example of Hardware Configuration of Automatic Driving Vehicle 1

Figure 1:
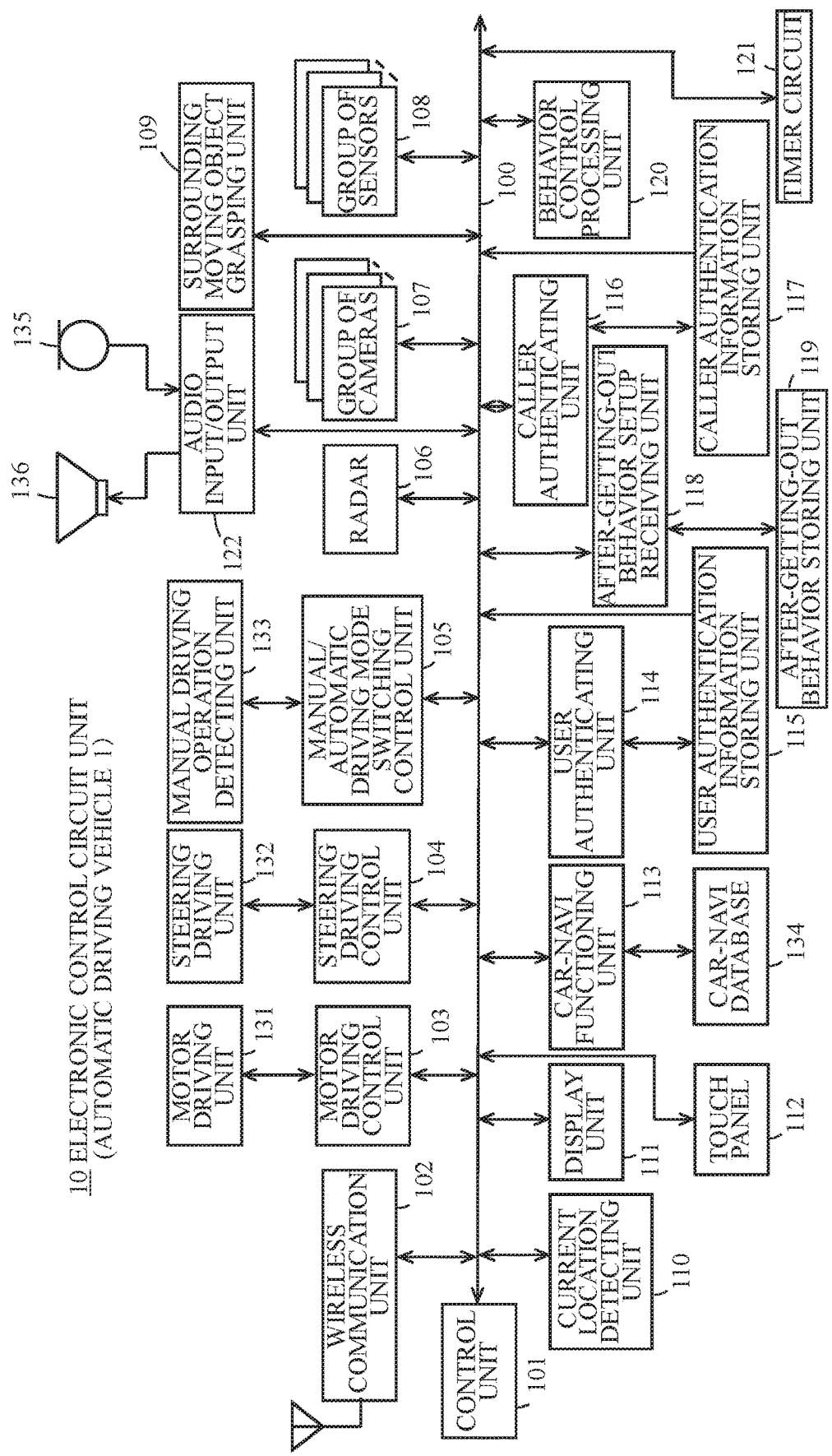
FIG. 1 is a block diagram showing an example of a configuration of an electronic control circuit unit according to an embodiment of an automatic driving vehicle by this invention.

FIG. 1 is a block diagram showing an example of a hardware configuration of an electronic control circuit unit 10 in an automatic driving vehicle 1 according to an embodiment of this invention. It should be noted that the automatic driving vehicle 1 according to this embodiment is an example of a case where the vehicle is an electric vehicle. However, illustration of a battery is omitted in FIG. 1.

The automatic driving vehicle 1 according to this embodiment includes an automatic driving mode and a manual driving mode. The manual driving mode is a mode in which the automatic driving vehicle 1 is allowed to travel in accordance with an accelerator pedal operation, a brake pedal operation, a shift lever operation and a steering operation (or a handle operation) of the driver as well as a normal vehicle that is not an automatic driving vehicle. Further, the automatic driving mode is a mode in which even though the driver does not carry out any of the accelerator pedal operation, the brake pedal operation, the shift lever operation and the steering operation, the automatic driving vehicle 1 itself changes routes automatically (or autonomously) to travel while avoiding an obstacle.

In this regard, the driver of the automatic driving vehicle 1 switches the automatic driving vehicle 1 while traveling in the manual driving mode into the automatic driving mode by means of a predetermined operation via a touch panel 112 (will be described later), for example. The automatic driving vehicle 1 is configured so as to automatically return to the manual driving mode when the driver carries out the accelerator pedal operation, the brake pedal operation, the shift lever operation or the steering operation while traveling in the automatic driving mode.

As shown in FIG. 1, in the electronic control circuit unit 10, a wireless communication unit 102, a motor driving control unit 103, a steering driving control unit 104, a manual/automatic driving mode switching control unit 105, a radar 106, a group of cameras 107, a group of sensors 108, the surrounding moving object grasping unit 109, a current location detecting unit 110, a display unit 111, a touch panel 112, a car navigation (hereinafter, abbreviated to "car-navi") functioning unit 113, a user authenticating unit 114, a user authentication information storing unit 115, a caller authenticating unit 116, a caller authentication information storing unit 117, an after-getting-out behavior setup receiving unit 118, an after-getting-out behavior storing unit 119, a behavior control processing unit 120, a timer circuit 121, and an audio input/output unit 122 are connected, through a system bus 100, to a control unit 101 configured so that a computer is mounted thereon.

A motor driving unit 131 is connected to the motor driving control unit 103. A steering driving unit 132 is connected to the steering driving control unit 104. A manual driving operation detecting unit 133 is connected to the manual/automatic driving mode switching control unit 105. Further, a car-navi database 134 is connected to the car-navi functioning unit 113. The user authentication information storing unit 115 is connected to the user authenticating unit 114. The caller authentication information storing unit 117 is connected to the caller authenticating unit 116. The after-getting-out behavior storing unit 119 is connected to the after-getting-out behavior setup receiving unit 118. Moreover, a microphone 135 for gathering a voice and a speaker 136 for reproducing and outputting a sound are connected to the audio input/output unit 122.

In this embodiment, the wireless communication unit 102 has a function to carry out communication, such as telephone communication and electronic mail communication via a mobile phone network and the Internet. Namely, the wireless communication unit 102 of the automatic driving vehicle 1 according to this embodiment is provided with a function as a member terminal in the mobile phone network, and has a member number of a mobile phone terminal. The control unit 101 has, as software processing functions, a function to carry out a process when a calling request is received from a caller via this wireless communication unit 102 and a function to call a mobile phone terminal of a user whose member telephone number of the mobile phone is registered and to notify a necessary message. As the mobile phone terminal of the user, a smartphone is used, for example.

The motor driving control unit 103 controls a supply of a driving signal to the motor driving unit 131 of the automatic driving vehicle 1, which is configured by the electric vehicle according to this embodiment, under a control of the control unit 101, and control traveling start, traveling speed control (including a brake control and an accelerator control), traveling stop and the like of the automatic driving vehicle 1.

The steering driving control unit 104 is configured to control, under a control of the control unit 101, a supply of a driving control signal to the steering driving unit 132 of the automatic driving vehicle 1 according to this embodiment, and control change in routes of the automatic driving vehicle 1.

The manual/automatic driving mode switching control unit 105 is configured to control switching of the driving mode of the automatic driving vehicle 1 to any of the manual driving mode and the automatic driving mode in response to a selection operation input through the touch panel 112. The manual driving operation detecting unit 133 receives operation information such as the accelerator pedal operation, the brake pedal operation, the shift lever operation, and the steering operation by the driver, and supplies the operation information for the manual driving to the manual/automatic driving mode switching control unit 105.

The manual/automatic driving mode switching control unit 105 is configured to supply, when the automatic driving vehicle 1 is in the manual driving mode, the operation information for the manual driving from the manual driving operation detecting unit 133 to the motor driving control unit 103 and the steering driving control unit 104, and control the motor driving unit 131 and the steering driving unit 132 in accordance with various kinds of the pedal operation, the shift lever operation, or the steering operation (or the handle operation) of the driver.

Further, the manual/automatic driving mode switching control unit 105 supplies, when the automatic driving vehicle 1 is in the automatic driving mode, operation information for the automatic driving generated in the control unit 101 to the motor driving control unit 103 and the steering driving control unit 104 on the basis of an output of the radar 106, the group of cameras 107, the group of sensors 108, or the surrounding moving object grasping unit 109 as will be described later, and controls driving of the motor driving unit 131 and the steering driving unit 132 by means of the operation information for the automatic driving. In this regard, in the automatic driving mode, a route from a current location toward a destination (destination set p by the driver in the car-navi functioning unit 113 is searched, and the automatic driving vehicle 1 is controlled to travel along the searched route.

The radar 106 is one that measures a distance between the automatic driving vehicle 1 and a person or an object that exists around the automatic driving vehicle 1, and is composed of a laser radar, a millimeter wave radar, or the like. The laser radar is embedded in a roof or in the vicinity of bumper, for example. The millimeter wave radar is provided in the front of the vehicle and in the rear of the vehicle, for example. Both the laser radar and the millimeter wave radar may be provided, or only one of them may be provided. Further, other radar such as a submillimeter wave radar and a micrometer wave radar may be used. Moreover, for the similar sake of the radar, a sonar (not shown in the drawings) may be used.

The group of cameras 107 includes: one camera to a plurality of cameras configured to photograph the interior of the automatic driving vehicle 1; and one camera to a plurality of cameras configured to photograph the surroundings of the exterior of the automatic driving vehicle 1, such as the front, the side and the rear of the automatic driving vehicle 1. The cameras configured to photograph the interior of the vehicle includes a camera configured to photograph a behavior of a person who gets in the automatic driving vehicle 1 and sits on the front passenger seat or a rear passenger seat (hereinafter, referred to as a "passenger"), in addition to a camera, attached to a back mirror (or rearview mirror, a room mirror), which is installed between a driver seat and a front passenger seat, or an upper portion of a front window, for example, configured to photograph a behavior of a person who sits on the driver seat (hereinafter, referred to as a "driver"). Further, the cameras configured to photograph the surroundings of the automatic driving vehicle 1 includes: two cameras (stereo camera), attached to a right side and a left side of the rearview mirror, configured to mainly photograph right front and left front of the automatic driving vehicle 1, for example; a camera, attached to a door mirror or a fender mirror of the automatic driving vehicle 1, for example, configured to photograph the right side and the left side; a camera configured to photograph the rear side of the automatic driving vehicle 1; an omnidirectional camera (360° camera) and a fish-eye camera attached to a roof and configured to photograph surroundings with a wide angle; and the like.

The group of sensors 108 is composed of a motion sensor (or infrared sensor, for example) configured to detect a person in the vicinity of the outside of the automatic driving vehicle 1 and various kinds of sensors for obtaining information that supports the automatic driving in addition to an open/close detecting sensor configured to detect open or close of the door and open or close of the window, a sensor configured to detect wearing of a seat belt, a seating sensor (a weight sensor or a pressure sensor, for example) configured to detect whether a passenger sits on a seat such as the driver seat or the front passenger seat, and a touch sensor (capacitance sensor, for example) configured to detect whether a person touches a handle of the driver's seat or the touch panel 112 (will be described later). As the various kinds of sensors for obtaining information that supports the automatic driving, a vibration sensor configured to detect vibration of the vehicle or a tire, for example, a rotational speed sensor configured to detect rotational speed of the tire, a geomagnetic sensor configured to detect an azimuth, an acceleration sensor configured to detect acceleration, a gyro sensor (or a gyroscope) configured to detect an angle or an angular velocity, and the like are contained. Further, in this embodiment, a sensor configured to detect lighting of a right winker, a left winker (direction indicator) or a hazard lamp (emergency flashing lamp) is contained in the group of sensors 108.

The surrounding moving object grasping unit 109 is configured to grasp a moving object (including a person) around the own vehicle using the radar 106, the group of sensors 108, and a photographed image of the group of cameras 107. The surrounding moving object grasping unit 109 carries out a process based on a Bayesian theory, for example, whereby an obstacle or a moving object around the vehicle is grasped.

The current location detecting unit 110 receives radio waves from GPS satellites, and detects a current location of the own vehicle. Since accuracy of the location detected on the basis of radio waves from the GPS satellites is low, the current location detecting unit 110 uses not only information on the current location detected by receiving the radio waves from the GPS satellites but also one sensor to plural sensors included in the group of sensors 108, the radar 106, the photographed image of the group of cameras 107 (together with a navigation function). The current location detecting unit 110 also carries out the process based on the Bayesian theory, for example, whereby the current location is detected and confirmed with higher accuracy.

In the automatic driving mode, the automatic driving vehicle 1 processes various kinds of information such as the location information obtained by receiving the radio waves from the GPS satellites, the radar 106, the group of cameras 107, and the group of sensors 108 in the current location detecting unit 110 and the surrounding moving object grasping unit 109, that is, information corresponding to information obtained from eyes and ears of a human by means of machine learning such as the Bayesian theory. On the basis of this, the control unit 101 carries out intellectual information processing (artificial intelligence) and control (artificial intelligence), such as change in routes of the own vehicle and avoidance of an obstacle, and generates the operation information for the automatic driving.

The display unit 111 is composed of an LCD (Liquid Crystal Display), for example. The touch panel 112 is configured so that a touch sensor capable of a touch input by a finger is superimposedly provided on a display screen of the display unit 111 that is composed of the LCD. A display image including a software button (including a button for character input of a keyboard) is displayed on the display screen of the display unit 111 on the basis of the control of the control unit 101. Then, when the touch panel 112 detects a touch by a finger on the software button displayed on the display screen, the touch panel 112 communicates the touch to the control unit 101. The control unit 101 that receives this is configured to carry out a control process corresponding to the software button.

Map data and route guidance data in the country are stored in advance in the car-navi database 134 connected to the car-navi functioning unit 113. The car-navi functioning unit 113 is a function unit for guiding the automatic driving vehicle 1 so as to help the automatic driving vehicle 1 to move to the specified destination on the basis of the map stored in the car-navi database 134 and the route guidance data. In this embodiment, the car-navi functioning unit 113 is configured so as to carry out the processes slightly different between the manual driving mode and the automatic driving mode.

Namely, in the manual driving mode, the car-navi functioning unit 113 displays an image, in which a location of the own vehicle detected and confirmed by the current location detecting unit 110 is superimposedly displayed on a map in which a route to the destination is explicitly displayed, on the display screen of the display unit 111. The car-navi functioning unit 113 moves the location of the own vehicle (current location) on the map along with movement of the own vehicle, and carries out voice guidance at a point at which a route guidance is required, such as an intersection and a junction on the route. This is similar to a normal car-navi function.

On the other hand, in the automatic driving mode, when the current location of the own vehicle is apart from the route to the destination, the car-navi functioning unit 113 notifies the control unit 101 of information on a separating direction and a distance. When the current location of the own vehicle exists on the route to the destination, the car-navi functioning unit 113 notifies the control unit 101 of change instruction information of a course direction along the route before an intersection or a junction on the route along with the movement of the own vehicle. The control unit 101 controls the motor driving unit 131 through the motor driving control unit 103 on the basis of the information notified by the car-navi functioning unit 113, the confirmation result of the current location of the current location detecting unit 110 and the result grasped by the surrounding moving object grasping unit 109 so that the own vehicle moves through a course as instructed on the route. The control unit 101 also generates the operation information for the automatic driving for controlling the steering driving unit 132 through the steering driving control unit 104. Therefore, on the basis of the route guidance to the destination by the car-navi functioning unit 113 and the control unit 101 in the automatic driving mode, the automatic driving vehicle 1 can move to the destination even in non-passenger state.

In this embodiment, the car-navi functioning unit 113 also includes a peripheral retrieval function. In addition to the map information, base point information (POI (Point Of Interest)) such as parking places for peripheral retrieval, convenience stores, and the like is stored in the car-navi database 134. In this regard, the car-navi functioning unit 113 is not provided with a peripheral retrieval function, the control unit 101 may realize the peripheral retrieval function as a function to transmit a peripheral retrieval request, which contains positional information such as current location information obtained by the current location detecting unit 110, to a peripheral retrieval server on the Internet through the wireless communication unit 102, and obtain its retrieval result, for example.

The user authenticating unit 114 carries out user authentication by using the information for authentication of the user, which is stored in the user authentication information storing unit 115, and the information for authentication obtained from the user. Here, the user is mainly the driver, but the user may be a passenger other than the driver. The automatic driving vehicle 1 according to this embodiment can carry out the autonomous traveling by means of the automatic driving mode even though no driver exists therein.

In this embodiment, for example, the user authentication is carried out on the basis of whether the face image of the most recently get-out person coincides with the face image of the new user (passenger) or not. For this reason, in this embodiment, this user authenticating unit 114 is configured as image recognizing means.

In this embodiment, a face image of the get-out person photographed by a predetermined camera of the group of cameras 107 is stored in the user authentication information storing unit 115. In this embodiment, the face image of the most recently get-out person photographed by the camera is updated and stored in the ser authentication information storing unit 115 so as to overwrite it on the face image of the get-out person previously stored. Of course, a history of the face image of the get-out person may be left without overwriting the face image.

In this regard, the user authentication can be carried out on the basis of voice of the user. In such a case, the automatic driving vehicle 1 collects a voice of the get-out person by means of the microphone 135, and stores the voice of the get-out person in the user authentication information storing unit 115. The user authenticating unit 114 is configured so as to include a speaker's voice recognizing function, and carries out the user authentication by determining whether the stored voice coincides with the voice of the user collected by the microphone 135 or not.

Further, the user authentication an be carried out by a fingerprint of the user. In such a case, a fingerprint reading device is provided in the automatic driving vehicle 1, and a fingerprint of the get-out person is stored in the user authentication information storing unit 115. The user authenticating unit 114 is configured to include a fingerprint recognizing function. The user authentication is carried out by determining whether the stored fingerprint coincides with a fingerprint of a new user obtained by the fingerprint reading device or not. A vein, an iris, or other biological information can be used for the user authentication. In such a case, the user authentication is applicable by means of the similar change of the configuration.

The caller authenticating unit 116 carries out the caller authentication described above using the information for authentication of the caller stored in the caller authentication information storing unit 117 and the information for authentication obtained from the caller when to receive calling by the wireless communication unit 102. In this embodiment, the caller authentication is carried out on the basis of whether the telephone number of the mobile phone terminal of the most recently get-out person coincides with the telephone number of the mobile phone terminal of the caller or not.

In this embodiment, a telephone number of the mobile phone terminal of the most recently get-out person, which is inputted through the touch panel 112, is stored in the caller authentication information storing unit 117. This telephone number stored in the caller authentication information storing unit 117 is set to only the telephone number of the most recently get-out person by overwriting the telephone number onto the telephone number stored previously. Of course, the telephone number may not be overwritten thereunto, but leave the telephone numbers stored previously.

The caller authenticating unit 116 obtains, when there is a call from the caller to the wireless communication unit 102, a telephone number of the call. The caller authenticating unit 116 is configured to carry out the caller authentication by determining whether the obtained telephone number coincides with the telephone number stored in the caller authentication information storing unit 117 or not.

In this regard, a configuration of each of the caller authenticating unit 116 and the caller authentication information storing unit 117 is also changed in accordance with a difference of information to be used as the information for authentication as well as a configuration of each of the user authenticating unit 114 and the user authentication information storing unit 115.

In this embodiment, the after-getting-out behavior setup receiving unit 118 receives a setup of a behavior after getting out from the automatic driving vehicle 1, which the automatic driving vehicle 1 has to conduct, from the user when the user such as the driver or a passenger other than the driver gets out from the automatic driving vehicle 1, and stores the received setup information in an embedded storing unit (whose illustration is omitted). In this embodiment, behaviors after getting out from the automatic driving vehicle 1 are registered and stored in the after-getting-out behavior storing unit 119 in advance by the user. The after-getting-out behavior setup receiving unit 118 presents a list of the behaviors after getting out from the automatic driving vehicle 1, which are stored in the after-getting-out behavior storing unit 119, to the user, and receives a setup of information on the behavior after getting out from the automatic driving vehicle 1, which is selected and set up from the list by the user.

In this case, although its illustration is omitted, an item of each of the behaviors after getting out from the automatic driving vehicle 1 in the after-getting-out behavior list (see FIG. 2, which will be mentioned later) may be configured as an icon button. When the user instructs an operation to touch each of the desired icon buttons on the touch panel 112, it is possible to input a selection setup for information on the behavior after getting out from the automatic driving vehicle 1. An example of the behavior after getting out from the automatic driving vehicle 1, which is stored in the after-getting-out behavior storing unit 119, and setup receiving processing by the after-getting-out behavior setup receiving unit 118 will be described later.

In this regard, as a method of inputting a setup of a behavior after getting out from the automatic driving vehicle 1, a reading input of the behavior after getting out from the automatic driving vehicle 1 can be carried out by means of the voice. The control unit 101 includes a voice recognizing function therefor.

The behavior control processing unit 120 carries out the behavior for the own vehicle after the user gets out from the automatic driving vehicle 1 on the basis of the behavior after getting out from the automatic driving vehicle 1, which is received by the after-getting-out behavior setup receiving unit 118. In this case, from a point of view that a movement control for the own vehicle is to be carried out in accordance with a control instruction by the driver when the driver gets in the automatic driving vehicle 1, the control unit 101 carries out control processing based on the received behavior after getting out from the automatic driving vehicle 1 only in a case where no driver exists within the own vehicle after the user gets out from the automatic driving vehicle 1 in this embodiment. An example of behavior control processing by the behavior control processing unit 120 will be described later in detail.

The timer circuit 121 has a function to provide the current time and to measure a time from a predetermined point of time.

The audio input/output unit 122 takes in the voice collected by the microphone 135, and sends it out to the system bus 100 for voice recognizing processing, for example. Further, although its illustration is omitted, the audio input/output unit 122 includes therein a memory for storing voice message data, which are to output to the outside, and includes therein a voice synthesizer and/or a D-A converter, by which the voice message data read out from the memory are converted into an analog voice signal. The audio input/output unit 122 then supplies a voice message selected by means of a control of the control unit 101 to the speaker 136, whereby the voice message is outputted to the outside as a voice. As the voice messages to be stored, as will be described later, an inquiry message such as "a behavior after getting out therefrom is set up?", a notice message such as "authenticated" and "authentication cannot be carried out", and an interactive message when an input of a setup for a behavior after getting out from the automatic driving vehicle 1 is received, and the like are prepared, for example.

The electronic control circuit unit 10 of the automatic driving vehicle 1 is configured as described above. However, the respective processing functions, including the motor driving control unit 103, the steering driving control unit 104, the manual/automatic driving mode switching control unit 105, the surrounding moving object grasping unit 109, the current location detecting unit 110, the car-navi functioning unit 113, the user authenticating unit 114, the caller authenticating unit 116, the after-getting-out behavior setup receiving unit 118, the behavior control processing unit 120, and the audio input/output unit 122, of the respective processing blocks shown in FIG. 1 can be realized as software processing, which is carried out in accordance with execution of programs by the control unit 101.

Example of Stored Information of
After-Getting-Out Behavior Storing Unit 119

As described above, behaviors after getting out from the vehicle, which the user wants to specify, are stored and held in advance in the after-getting-out behavior storing unit 119. As the behaviors after getting out from the automatic driving vehicle 1, one behavior can be selected from ones registered in the automatic driving vehicle 1 as a default in advance by a vehicle company or the like, or the ones can be set up and stored by the user. Further, ones stored on a cloud of the Internet can be used via the wireless communication unit 102.

FIG. 2 shows an example of the behavior after getting out, which is stored in the after-getting-out behavior storing unit 119, in this embodiment. Examples of the respective behaviors after getting out will be described.

A behavior "movement to prescribed parking place" means that after the user gets out from the automatic driving vehicle 1, the automatic driving vehicle 1 is caused to move to a prescribed parking place registered in advance. This behavior after getting out from the automatic driving vehicle 1 is terminated on the basis of the movement to the parking place. Here, as the prescribed parking place, a plurality of parking places can be registered. For example, a "home parking place", a "company parking place", a "contracted parking place" and the like can be registered. Registration of the parking place means that its positional information and a name (classification) of a parking place such as the "home parking place", the "company parking place", or the "contracted parking place" are stored. When the user selects and sets up the behavior "movement to prescribed parking place" as the behavior after getting out from the automatic driving vehicle 1 (hereinafter, also referred to as the "after-getting-out behavior", the user also selects and sets up a name of the prescribed parking place.

A behavior "wait at neighboring parking place until calling" means that the automatic driving vehicle 1 searches a parking place in vicinity of a getting-off location of the user, waits at the parking place, and then, when the user communicates a telephone calling through the wireless communication unit 102 of the automatic driving vehicle 1 by means of the mobile phone terminal, the automatic driving vehicle 1 returns to the place where the user gets out from the automatic driving vehicle 1 in response to the calling. In this case, in this embodiment, at the time of getting out from the automatic driving vehicle 1, the user registers information for authentication at the time of calling and information for authentication for getting in the automatic driving vehicle 1 again.

The behavior control processing unit 120 of the automatic driving vehicle 1 carries out authentication for the caller using the information for authentication registered at the time of calling when there is a calling by the user through the mobile phone terminal. The behavior control processing unit 120 carries out a movement control to return to the place where the user gets out from the automatic driving vehicle 1 in response to the calling only in a case where the authentication is OK. In this embodiment, as the information for authentication at the time of calling, a telephone number (member number) of the mobile phone terminal of the caller is registered at the time of getting out from the automatic driving vehicle 1, for example. When a calling from the caller is received, the behavior control processing unit 120 carries out the authentication on the basis of whether the telephone number of the caller is a registered telephone number or not.

Then, in a case where the behavior control processing unit 120 of the automatic driving vehicle 1 detects that the user gets therein again, the behavior control processing unit 120 uses the information for authentication registered as the time of getting therein again when to get therein again to carry out authentication for a passenger who gets therein again (hereinafter, referred to as "re-enter-passenger"). The behavior control processing unit 120 controls the authentication so as to permit the usage of the own vehicle by the re-enter-passenger only in a case where the authentication is OK. In this embodiment, as the information for authentication at the time of getting in the automatic driving vehicle 1 again, the face image of the user is registered at the time of getting out from the automatic driving vehicle 1, for example. When the user gets in the automatic driving vehicle 1 again, the automatic driving vehicle 1 carries out authentication by means of face recognition using the face image on the basis of whether the user is the get-out person thus registered or not.

In this regard, the information for authentication at the time of calling is not limited to the telephone number of the mobile phone terminal. It may be an e-mail address. Further, the authentication may be carried out by registering a password and/or an ID or the like, causing the user to transmit the password and the ID by means of communication based on reception of calling from the caller, and confirming coincidence of the both. A combination of a telephone number, an e-mail address, their password and ID may be the information for authentication at the time of calling.

Further, the information for authentication of the re-enter-passenger is not limited to the face image. This information may be biological information such as a voice, a fingerprint, a vein, and an iris. Moreover, a password and/or an ID may be used as this information. Further, combination of them may be used as the information for authentication.

The behavior "wait here" means a behavior in which the automatic driving vehicle 1 waits at the place where the user gets out from the automatic driving vehicle 1 as it is. In this case, in this embodiment, the user registers his or her information for authentication for getting in the automatic driving vehicle 1 again at the time of getting out from the automatic driving vehicle 1. This information for authentication for getting in the automatic driving vehicle 1 may be similar to one that has been explained in the behavior "wait at neighboring parking place until calling" described above. In this embodiment, the information for authentication is a face image of the user (for example, the driver).

A behavior "go to Spot A" means a behavior in which the automatic driving vehicle 1 goes to a place designated by the user. The Spot A is designated or specified by the user at the time of getting out from the automatic driving vehicle 1. This Spot A may be set up among spots registered in advance. For example, the Spot A may be designated on the map, designated by inputting an address or designating an identifiable building name or the like. Further, the Spot A may be designated by means of a two-dimensional coordinate of a degree of latitude and a degree of longitude (or a three-dimensional coordinate in addition to elevation). Moreover, in a case where the Spot A can be specified by a telephone number, the user may input the telephone number to designate the Spot A. In a case where the Spot A can be specified by a URL (Uniform Resource Locator) or an e-mail address, the user may input the URL or the e-mail address to designate the Spot A.

The re-enter-passenger in case of the behavior "go to Spot A" is not limited to the user who gets out from the automatic driving vehicle 1. Thus, in this embodiment, a password and/or an ID is set up as the information for authentication of the re-enter-passenger.

A behavior "go to pick up in response to calling" is one in which after the user gets out from the automatic driving vehicle 1, the automatic driving vehicle 1 can carry out a free action until calling, but the automatic driving vehicle 1 is caused to go to the place designated by the user to pick up when the user communicates a telephone calling by the mobile phone terminal through the wireless communication unit 102 of the automatic driving vehicle 1 in response to the calling. In this case, when the user communicates a calling by a telephone with the automatic driving vehicle 1, the information on the place where the automatic driving vehicle 1 is to go to pick up is transmitted to the automatic driving vehicle 1 by means of the telephone communication. For example, the information on the current location measured by the GPS with which the mobile phone terminal of the user is provided is transmitted from the mobile phone terminal of the user to the automatic driving vehicle 1 as the information on the place where the automatic driving vehicle 1 goes to pick up. Moreover, in this case, the information for authentication at the time of calling and the information for authentication for getting the automatic driving vehicle 1 in again are also registered when the user gets out from the automatic driving vehicle 1. With respect to the information for authentication at the time of calling and the information for authentication for getting in the automatic driving vehicle 1 again, the process similar to that of the behavior "wait at neighboring parking place until calling" is carried out.

A behavior "wait at the Spot B" means that the automatic driving vehicle 1 waits at a place designated by the user until the user gets in the automatic driving vehicle 1 again. The Spot B is designated by the user at the time of getting out from the automatic driving vehicle 1. This Spot B may be set up from spots registered in advance. For example, the Spot B may be designated on the map, designated by inputting the address or designating an identifiable building name or the like. Further, the Spot B may be designated by means of a two-dimensional coordinate of a degree of latitude and a degree of longitude (or a three-dimensional coordinate in addition to elevation). Moreover, in a case where the Spot B can be specified by a telephone number, the user may input the telephone number to designate the Spot B. In a case where the Spot B can be specified by a URL or an e-mail address, the user may input the URL and the e-mail address to designate the Spot B.

As the information for authentication of the user in this case at the time of getting in the automatic driving vehicle 1 again, it can be similar to one explained for the behavior "wait at neighboring parking place until calling" described above. In this embodiment, the information for authentication is a face image of the user (for example, the driver).

A behavior "return to getting-off location after predetermined time" is a behavior after getting out from the automatic driving vehicle 1, which assumes that the user returns to the getting-off location (current location) after a predetermined time for which the user carries out a predetermined errand after getting out from the automatic driving vehicle 1 (including a behavior in which the automatic driving vehicle 1 does not move but stays here). At the time of getting out from the automatic driving vehicle 1, the user directly sets up the "predetermined time", or inputs information for grasping the "predetermined time". Namely, as the method of setting up the "predetermined time" in this case, there are cited as follows:

(a) a setup of a timer time to the timer circuit 121, (b) a setup by a voice input, such as "a little errand", "toilet", "meal", "concert", "baseball game watching", "football game watching", "grand sumo tournament watching", "two or three minutes", "about one hour" and the like, for example, and (c) selection from a list of predetermined errand displayed on the display unit 111.

Examples of a method of grasping a predetermined time from an input of information for grasping a predetermined time of each of (b) and (c) by the control unit 101 of the automatic driving vehicle 1 will be described below. In this regard, in case of (b), words put around double quotation marks (" ") are inputted by a voice. In case of (c), words put around double quotation marks (" ") are selected from the list.

"grand sumo tournament watching" In case of the annual matches (Honbasho), the match is terminated at about 18 o'clock. Therefore, the predetermined time is grasped using the termination time as a guide.

"baseball game watching" In case of a professional baseball game, about three hours from the start is a guide. In case of a high school baseball game, about two hours from the start is a guide. A time is added when an extra-inning game is carried out. In a case where a broadcasting relay or the like is obtained from a predetermined site through the Internet, it is possible to grasp a game termination time.

"football game watching" A predetermined time is grasped on the basis of the first half of 45 minutes, a half time of 15 minutes, the second half of 45 minutes, and a little injury time (loss time). A time is added when an extra game is carried out. In a case where a broadcasting relay or the like is obtained from a predetermined site through the Internet, it is possible to grasp a game termination time.

"concert" A curtain falling time announced by the sponsor is a guide. At the time of getting out from the automatic driving vehicle 1, the curtain falling time is inputted by the user, and the predetermined time is grasped by using the time as a guide.

"watching movie" A curtain falling time is decided. At the time of getting out from the automatic driving vehicle 1, the curtain falling time is inputted by the user, and the predetermined time is grasped using the time as a guide.

"shopping center" The predetermined time is grasped as two hours on the basis of an experience value and a statistic value, for example.

"department store" The predetermined time is grasped as two hours on the basis of an experience value and a statistic value, for example.

"mass merchandiser market (home electronics or computer)" The predetermined time is grasped as one hour on the basis of an experience value and a statistic value, for example.

"bookstore" The predetermined time is grasped as 30 minutes on the basis of an experience value and a statistic value, for example.

"flower shop" The predetermined time is grasped as 15 minutes on the basis of an experience value and a statistic value, for example.

"small store" The predetermined time is grasped as 15 minutes on the basis of an experience value and a statistic value, for example.

"convenience store" The predetermined time is grasped as 15 minutes on the basis of an experience value and a statistic value, for example.

"post office" Although it is depending on a waiting time, the predetermined time is grasped as ten minutes, for example.

"bank" Although it is depending on a waiting time, the predetermined time is grasped as five minutes for an ATM and 20 minutes for a counter thereof.

"cramming school" The termination time is decided. The termination time is inputted by the user at the time of getting out from automatic driving vehicle 1. The predetermined time is grasped as two hours using the time as a guide, for example.

"restaurant" The predetermined time is grasped as 30 minutes for lunch and two hours for dinner, for example.

"coffee shop" The predetermined time is grasped as one hour, for example.

"fishing pond" The predetermined time is grasped as two hours, for example.

"shrine or temple" First visit of the year to a shrine or the like. For example, the predetermined time is grasped as one hour.

"zoo or aquarium" The predetermined time is grasped as three hours, for example.

"vehicle advance inhibiting area" In a case where the user wants to see beyond that point even though there is a display such as "please refrain a car from entering ahead of here", the user gets out from a vehicle to see it. For example, the predetermined time is grasped as 15 minutes.

In this regard, the automatic driving vehicle 1 may determine a state of the user (a state in hurry, a state in slow, and the like) or TPO (a status, a degree of congestion, and the like), and determine the time. Further, presence or absence of a parking space at the place where the user gets out from the automatic driving vehicle 1 may of course be used as a condition to determine the predetermined time.

In this example, although the behavior after getting out from the automatic driving vehicle 1 is set to the behavior "return to getting-off location after predetermined time", it is also possible to set to the behavior "return to getting-off location at predetermined time". Further, both of the behaviors after getting out from the automatic driving vehicle 1 may be prepared.

A behavior "stay at the Spot C after predetermined time" is a behavior after getting out from the automatic driving vehicle 1, which assumes that the user carries out a predetermined errand after getting out from the automatic driving vehicle 1, and the automatic driving vehicle 1 moves to another Spot C other than the getting-off location (current location), which is a spot where the user get in the automatic driving vehicle 1 again after a predetermined time. As well as the behavior "return to getting-off location after predetermined time", at the time of getting out from the automatic driving vehicle 1, the user directly sets up the "predetermined time" or inputs information for grasping the "predetermined time", and set up the Spot C. The Spot C may be set up to one from spots registered in advance. For example, the Spot C may be designated on the map, or designated by inputting an address thereof or designating an identifiable building name or the like. Further, the Spot C may be designated by means of a two-dimensional coordinate of a degree of latitude and a degree of longitude (or a three-dimensional coordinate in addition to elevation). Moreover, in a case where the Spot C can be specified by a telephone number, the user may input the telephone number to designate the Spot C. In a case where the Spot C can be specified by a URL and/or an e-mail address, the Spot C may be designated by inputting the URL and/or the e-mail address.

In a case where the Spot C is near the getting-off location (current location), a method of setting up the "predetermined time" and a method of grasping the predetermined time by the control unit 101 of the automatic driving vehicle 1 are similar to those in the behavior "return to getting-off location after predetermined time". In a case where the Spot C is located far away from the getting-off location (current location) (for example, one kilometer or longer), a travel time from the getting-off location (current location) to the Spot C greatly influences on the predetermined time. For that reason, there is a need to grasp the predetermined time by adding a time required for movement thereto because it is in short by a time required for the predetermined errand. In order to calculate (or estimate) the travel time, the user is required to input information at least containing moving means and a travel distance or travel section by the moving means. Therefore, it is preferable that the user directly set up the "predetermined time" at the time of getting out from the automatic driving vehicle 1 in a case where the Spot C is located far away from the getting-off location (current location).

In this example, the behavior after getting out from the automatic driving vehicle 1 is not set to the behavior "stay at the Spot C after predetermined time", but can be set to a behavior "stay at Spot C for predetermined time" in the similar manner to that of the behavior "return to getting-off location after predetermined time". Further, both of the after-getting-out behaviors may be prepared.

In this regard, in a case where user's getting in the automatic driving vehicle 1 again or calling is significantly earlier or later than the "after predetermined time" or "predetermined time" (for example, in a case where the behavior "return to getting-off location after two hours" is set up, but the user returns to the automatic driving vehicle 1 after ten minutes), authentication is to be carried out more strictly. This is because there is a possibility of impersonation of the user, or a risk of a trouble. For example, the authentication is carried out by combining plural kinds of information for authentication surely, issuing a warning such as an alarm sound at the time of authentication, photographing a face image of the re-enter-passenger, recording a voice of the caller, or the like. Further, the control unit 101 may carry out the authentication for the user who gets in the automatic driving vehicle 1 again by making a call to the mobile phone terminal of the user through the wireless communication unit 102 and confirming it.

Example of Processing Operation when User Gets Out From the Automatic Driving Vehicle 1 According to the Embodiment Next, an outline of a processing operation by the control unit 101 of the automatic driving vehicle 1 when a user who gets in the automatic driving vehicle 1 (in this example, particularly, the driver) is getting out from the automatic driving vehicle 1 will be described.

In this embodiment, when the user who gets in the automatic driving vehicle 1, in this example, particularly a driver tries to get out from the automatic driving vehicle 1, the automatic driving vehicle 1 inquires of the driver who tries to get out from the automatic driving vehicle 1 whether a behavior after getting out from the automatic driving vehicle 1 is to be set up or not. In a case where the driver inputs the setup of the behavior after getting out from the automatic driving vehicle 1 in response to this inquiry, the automatic driving vehicle 1 receives an input of the setup of the behavior after getting out from the automatic driving vehicle 1 by the driver, and carries out a process according to the received behavior after getting out from the automatic driving vehicle 1 after the driver gets out from the automatic driving vehicle 1.

Figure 3:
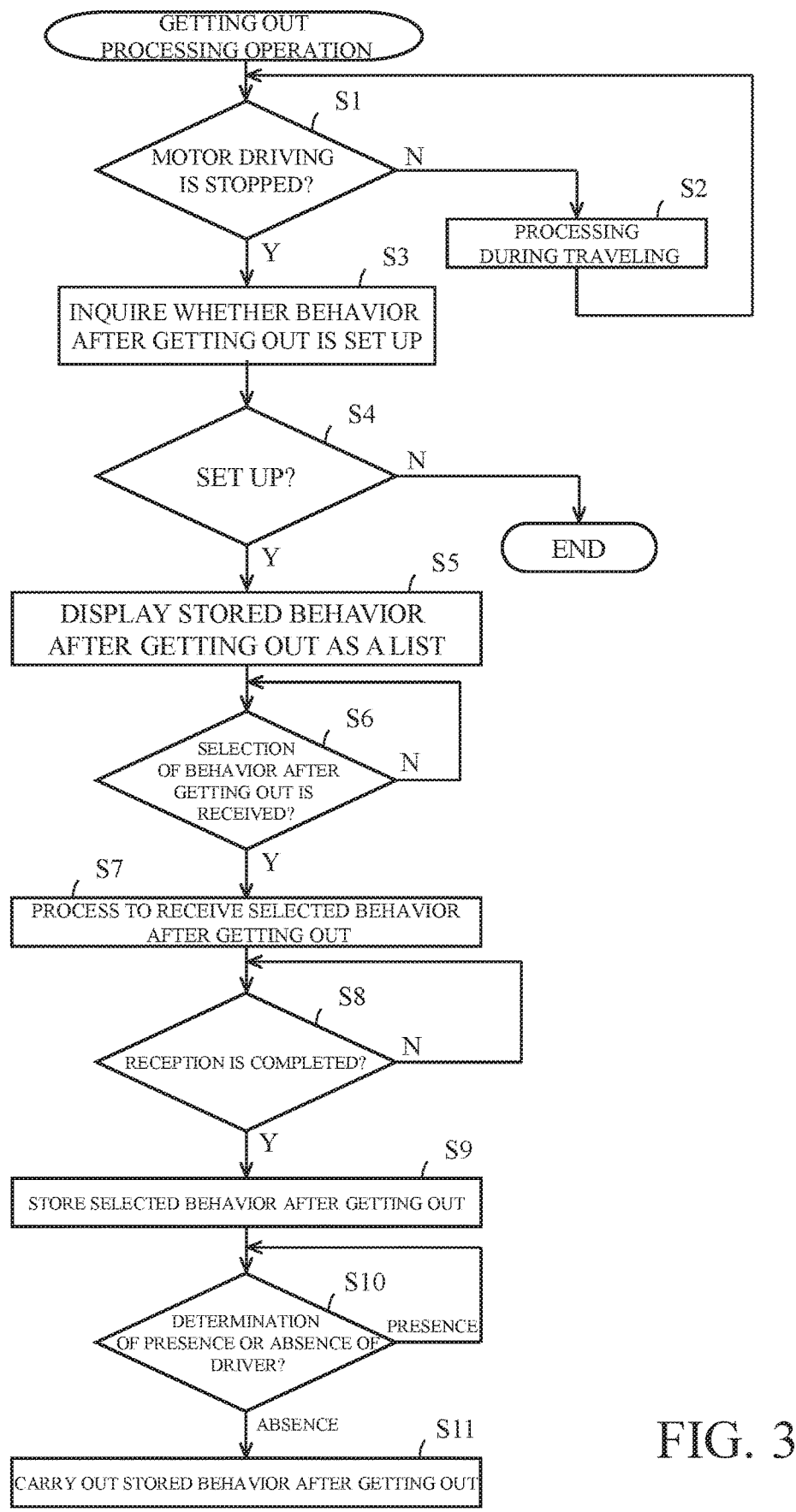
FIG. 3 is a view showing a flowchart for explaining an outline of a processing operation according to the embodiment of the automatic driving vehicle by this invention.

FIG. 3 is a flowchart for explaining an example of a flow of a processing operation that is carried out by the control unit 101 of the electronic control circuit unit 10 in the automatic driving vehicle 1 when the driver gets out from the automatic driving vehicle 1. In this regard, a case where a process of each Step in the flowchart of FIG. 3 is realized by executing programs for the respective processing functions of the after-getting-out behavior setup receiving unit 118 and the behavior control processing unit 120 as software processing by means of the control unit 101 will be described.

The control unit 101 determines whether drive of the motor driving unit 131 in the own vehicle is stopped by the driver or not (Step S1). In a case where it is determined at Step S1 that the drive of the motor driving unit 131 is not stopped, the control unit 101 continues the control necessary for the time of traveling (Step S2), and then causes the processing flow to return to Step S1.

In a case where it is determined at Step S1 that the drive of the motor driving unit 131 is stopped, it is normally expected that the driver will get out from the automatic driving vehicle 1. Thus, the control unit 101 displays a message of an inquiry of whether a behavior after getting out from the automatic driving vehicle 1 is to be set up or not on the display unit 111, and outputs the message as a voice through the speaker 136 (Step S3).

The control unit 101 monitors and determines a reply to the inquiry at Step S3 from the driver (Step S4). In a case where it is determined that the driver replies that the behavior after getting out from the automatic driving vehicle 1 is not set up, the control unit 101 terminates this processing routine in FIG. 3. In this case, the automatic driving vehicle 1 stops the motor driving unit 131 at the location where the driver gets out from the automatic driving vehicle 1, and turns off power supply while maintaining power feeding to sections necessary as a process during stop. Further, a predetermined behavior in a case where the driver does not set up a behavior after getting out from the automatic driving vehicle 1 may be set up in advance, and the automatic driving vehicle 1 may carry out it. The predetermined behavior set up in advance may become schedule information.

In a case where it is determined at Step S4 that the driver replies that the behavior after getting out from the automatic driving vehicle 1 is to be set up, the control unit 101 displays, on the display screen of the display unit 111, the behaviors after getting out from the automatic driving vehicle 1 stored in the after-getting-out behavior storing unit 119 as the list as shown in FIG. 2 (Step S5).

Next, the control unit 101 then monitors an input operation of the user through the touch panel 112, and waits for receipt of a selection operation of the after-getting-out behavior from the list displayed on the display screen (Step S6). In a case where it is determined at Step S6 that the selection operation of the after-getting-out behavior is received from the list, the control unit 101 carries out a process to receive the selected after-getting-out behavior (Step S7). An after-getting-out behavior receiving processing thus selected carried out at Step S7 will be described later in detail.

Next, the control unit 101 determines whether the process to receive the selected behavior after getting out is completed or not (Step S8). In a case where it is determined that the process to receive the selected behavior after getting out is completed, the control unit 101 stores selection information on the behavior after getting out selected by the user and information associated with it (Step S9). In this regard, in a case where the process to receive the selected behavior after getting out is not completed within a predetermined time (for example, 10 minutes), the control unit 101 may determine that the user does not set up a behavior after getting out from the automatic driving vehicle 1, and terminate the processing routine in FIG. 3. In this case, as well as the case described above, the automatic driving vehicle 1 stops the motor driving unit 131 at the location where the driver gets out from the automatic driving vehicle 1, and turns off the power supply while maintaining power feeding to sections necessary as the process during stop. Further, a predetermined behavior in a case where the driver does not set up a behavior after getting out from the automatic driving vehicle 1 may be set up in advance, and the automatic driving vehicle 1 may carry out it. The predetermined behavior set up in advance may become the schedule information.

Next, the control unit 101 confirms whether the user gets out from the automatic driving vehicle 1 or not by means of a door sensor or the like, and determines presence or absence of the driver (Step S10). The presence or absence of the driver is determined on the basis of the weight sensor provided in the driver's seat, the seating sensor consisted of the pressure sensor or the like, the touch sensor for determining whether a person touches the handle or the touch panel 112 or not, and the photographed image of the camera configured to photograph the driver on the driver's seat of the group of cameras 107. Alternatively, whether the user gets out from the automatic driving vehicle 1 or not is determined on the basis of presence or absence of the voice of the driver on the driver's seat, which is collected by the microphone 135. Then, when the driver exists therein, the control unit 101 waits for getting off of the driver. In a case where it is determined at Step S10 that the driver gets out from the automatic driving vehicle 1 and does not stay therein, the control unit 101 carries out the selected after-getting-out behavior thus stored (Step S11). In a case where the automatic driving vehicle 1 travels and moves at Step S11, the automatic driving vehicle 1 carries out the autonomous traveling by means of the automatic driving mode.

Example of Flow of After-Getting-Out Behavior Setup Receiving Processing

Figure 4:
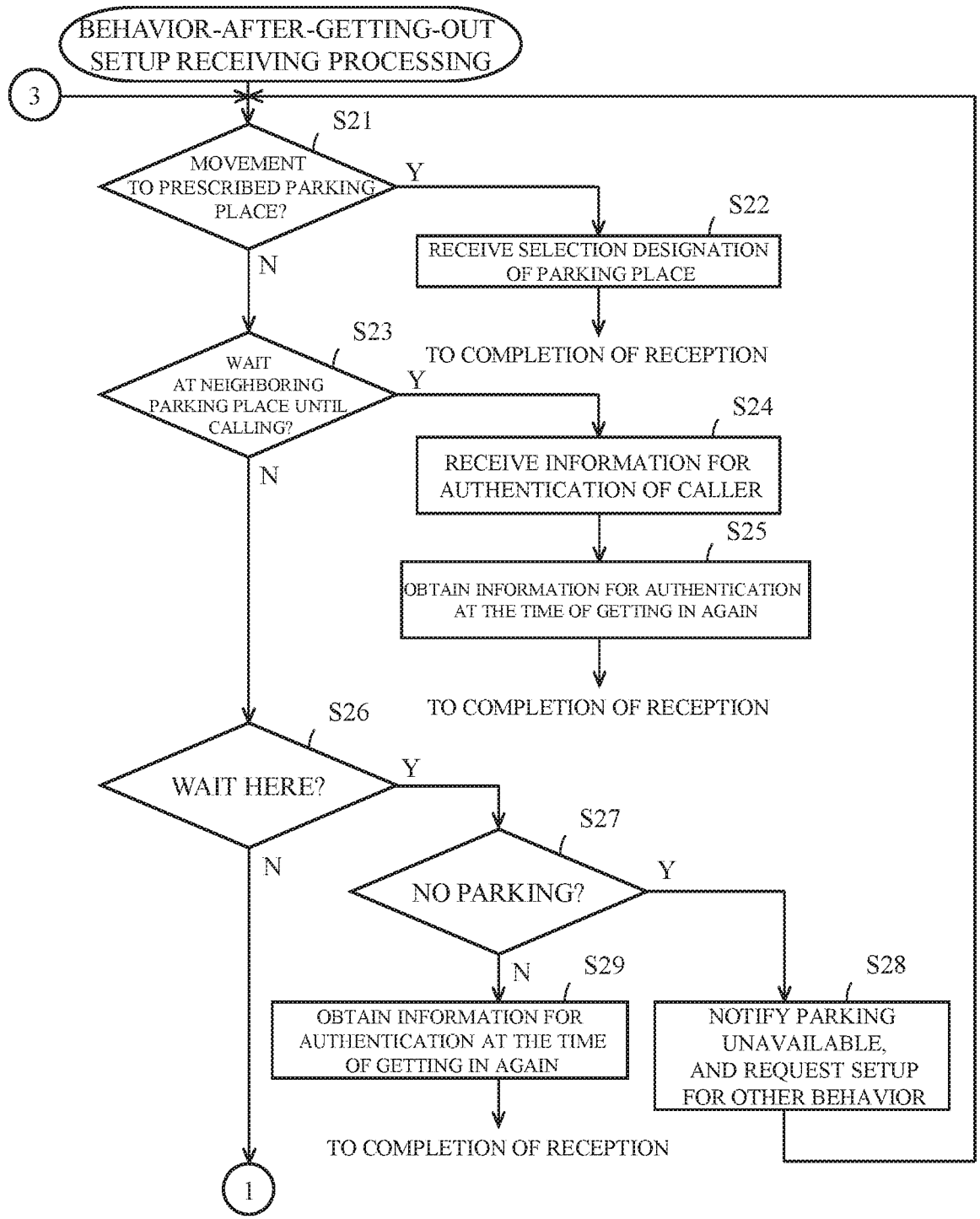
FIG. 4 is a view showing a part of a flowchart for explaining a flow of an after-getting-out behavior setup receiving operation according to the embodiment of the automatic driving vehicle by this invention.
Figure 5:
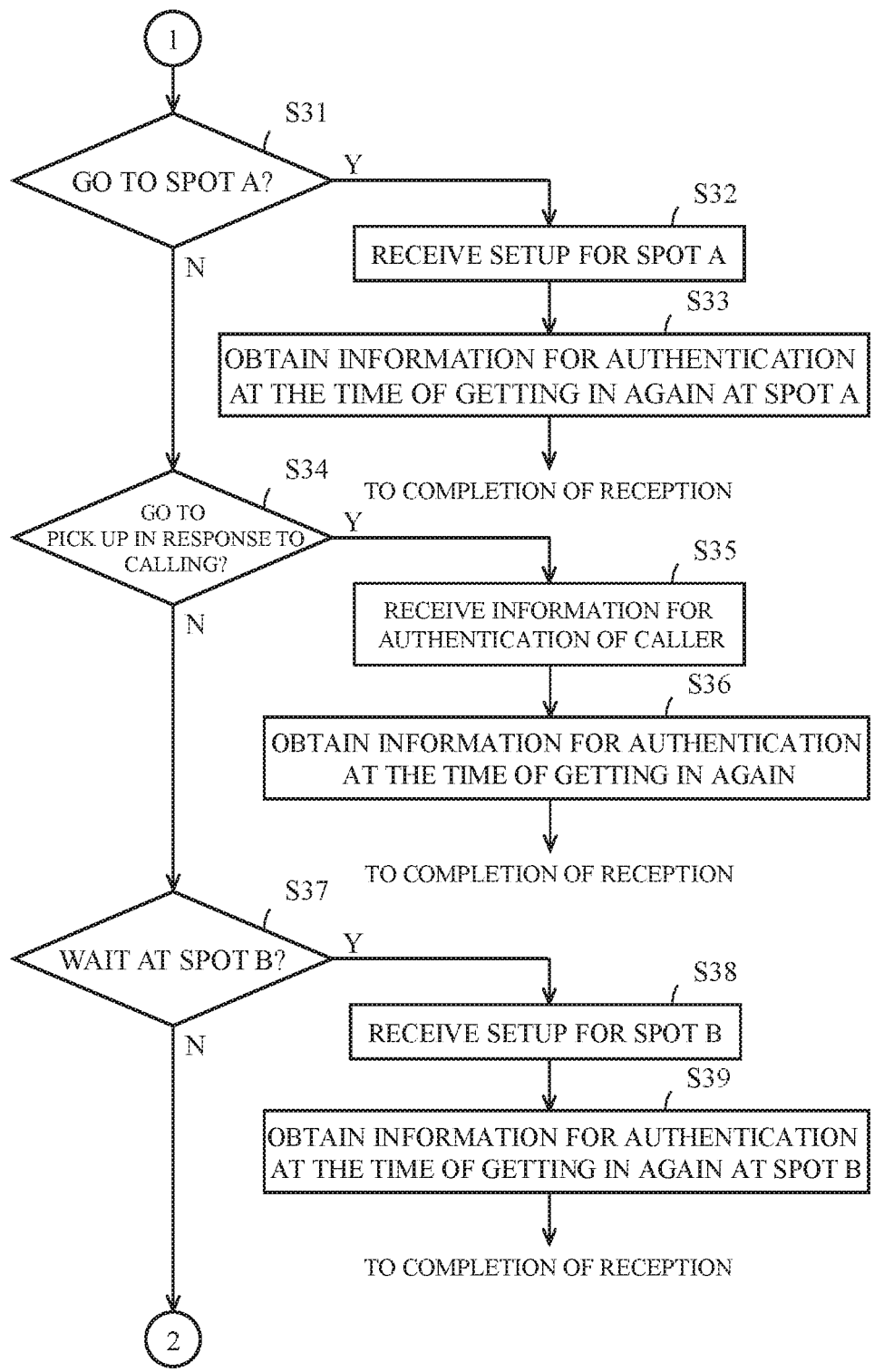
FIG. 5 is a view showing a part of the flowchart for explaining a flow of an after-getting-out behavior setup receiving operation according to the embodiment of the automatic driving vehicle by this invention.
Figure 6:
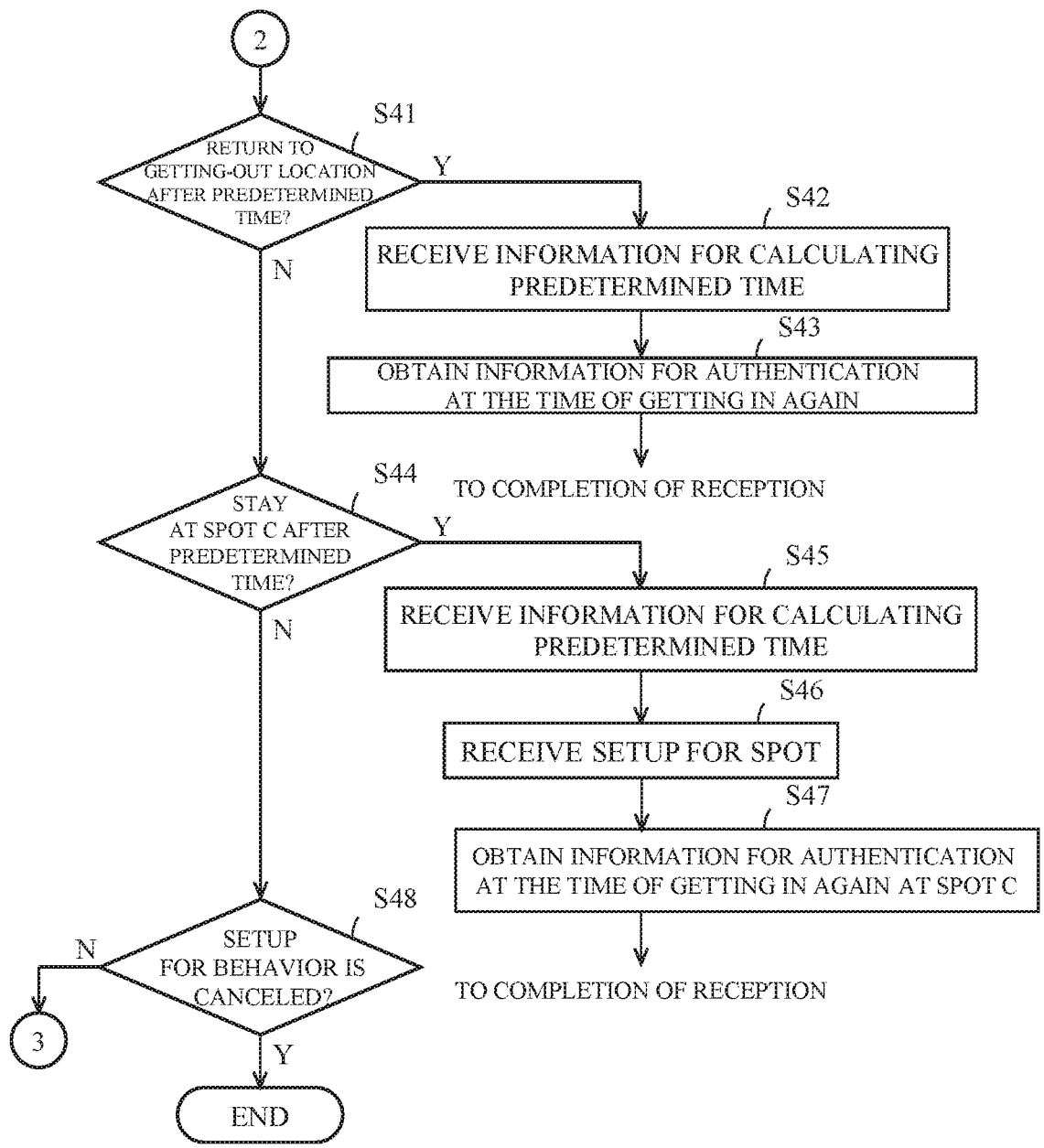
FIG. 6 is a view showing a part of the flowchart for explaining a flow of an after-getting-out behavior setup receiving operation according to the embodiment of the automatic driving vehicle by this invention.

Next, an example of a flow of the after-getting-out behavior setup receiving processing at Step S7 will be described. FIG. 4 to FIG. 6 are flowcharts for explaining an example of a flow of the after-getting-out behavior receiving processing. In this example, the setup receiving processing in which each of the after-getting-out behaviors in the list shown in FIG. 2 is selected will be assumed and described.

A case where a process of each Step in the flowcharts of FIG. 4 to FIG. 6 is also realized by executing programs for the respective processing functions of the after-getting-out behavior setup receiving unit 118 as software processing by means of the control unit 101 will be described. In this regard, in this embodiment, the control unit 101 talks with the user in an interactive manner, and receives a setup of the behavior after getting out from the automatic driving vehicle 1.

The control unit 101 first determines whether "movement to prescribed parking place" is selected by the user or not (Step S21). In a case where it is determined that the behavior "movement to prescribed parking place" is selected, the control unit 101 informs the user of a message to prompt the user to select and designate any of the behaviors "home parking place", "company parking place", and "contracted parking place" with respect to the prescribed parking place through the display unit 111 (in addition, the control unit 101 may informs the user of it by means of audio through the speaker 136), and receives a selection designation of the prescribed parking place from the user (Step S22). At this time, next to Step S22, the control unit 101 determines completion of the receipt at Step S8 in FIG. 3, and at next Step S9, the control unit 101 stores a selection designation for the selected after-getting-out behavior "movement to prescribed parking place" and a selection designation for any of a "home parking place", a "company parking place", and a "contracted parking place". In this regard, as will be described later, as the prescribed parking place, a "parking place dedicated for specific facility" may be added to the selection designation.

In a case where it is determined at Step S21 that the behavior "movement to prescribed parking place" is not selected, the control unit 101 determines whether the behavior "wait at neighboring parking place until calling" is selected by the user or not (Step S23). In a case where it is determined at Step S23 that the behavior "wait at neighboring parking place until calling" is selected by the user, the control unit 101 informs the user of a message to prompt the user to input the information for authentication of the caller through the display unit 111 (in addition, the control unit 101 may informs the user of it by means of audio through the speaker 136), and receives an input of the information for authentication of the caller from the user (Step S24). As described above, in this example, the telephone number of the mobile phone terminal of the caller is inputted as the information for authentication for the caller.

Next, the control unit 101 obtains the information for authentication when the user gets in the automatic driving vehicle 1 again (Step S25). As described above, in this embodiment, a face image of the driver as the user is photographed by means of the camera in the group of cameras 107, which is used for photographing the driver's seat, and the control unit 101 obtains the face image as the information for authentication of the re-passenger. Next to Step S25, the control unit 101 determines completion of the receipt at Step S8 in FIG. 3, and at next Step S9, the control unit 101 stores a selection designation for the selected after-getting-out behavior "wait at neighboring parking place until calling" in the storing unit of the after-getting-out behavior setup receiving unit 118, and stores the telephone number of the mobile phone terminal as the information for authentication of the caller n the caller authentication information storing unit 117. In addition, the control unit 101 stores the "face image of the driver" as the information for authentication for getting therein again in the user authentication information storing unit 115.

In a case where it is determined at Step S23 that the behavior "wait at neighboring parking place until calling" is not selected, the control unit 101 determines whether the behavior "wait here" is selected by the user or not (Step S26). In a case where it is determined at Step S26 that the behavior "wait here" is selected by the user, the control unit 101 determines whether the current location (that is, the getting-off location) is a no parking place or not (Step S27) Whether the current location is a no parking place or not is determined on the basis of photographed images of the camera configured to photograph the surroundings thereof of the group of cameras 107 by recognizing whether there is a sign or marking for no parking or not. In this regard, a case of a place where parking/stopping is inhibited is similar to the case of the place where parking is inhibited. In this embodiment, such a case is included in the "no parking" place.

In a case where it is determined at Step S27 that the current location is a no parking place, the control unit 101 notifies the user that the current location is a no parking place, and informs the user of a message to prompt the user to request a setup of other behavior after getting out from the automatic driving vehicle 1 through the display unit 111 (in addition, the control unit 101 may informs the user of it by means of audio through the speaker 136) (Step S28). The control unit 101 then causes the processing flow to return to the process at Step S21, and waits for a re-setup of a behavior after getting out from the automatic driving vehicle 1 from the user.

In a case where it is determined at Step S27 that the current location is not a no parking place, the control unit 101 obtains the information for authentication when the user gets in the automatic driving vehicle 1 again (Step S29). This process at Step S29 is similar to that at Step S25 described above. In this embodiment, the control unit 101 obtains a face image of the driver as the user as the information for authentication of the re-enter-passenger. Next to Step S29, the control unit 101 then determines completion of the receipt at Step S8 in FIG. 3, and at next Step S9, the control unit 101 stores a selection designation for the selected after-getting-out behavior "wait here" in the storing unit of the after-getting-out behavior setup receiving unit 118, and stores the "face image of the driver" as the information for authentication of the re-enter-passenger in the user authentication information storing unit 115.

Next, in a case where it is determined at Step S26 that the behavior "wait here" is not selected, the control unit 101 determines whether the behavior "go to Spot A" is selected by the user or not (Step S31 in FIG. 5). In a case where it is determined at Step S31 that the behavior "go to Spot A" is selected by the user, the control unit 101 informs the user of a message to prompt the user to input a setup of the "Spot A" through the display unit 111 (in addition, the control unit 101 may informs the user of it by means of audio through the speaker 136), and receives the setup of the "Spot A" from the user (Step S32). At this time, the control unit 101 displays, at Step S32, a map in which the current location is centered on the display screen of the display unit 111, and receives the setup of the "Spot A" on the map. Alternatively, the control unit 101 may receive an input of an address of the "Spot A" from the user, or may present facilities or the like around the current location to receive a selection input from the user. Further, the control unit 101 may receive an input of a two-dimensional coordinate of the "Spot A" consisted of a degree of latitude and a degree of longitude (or a three-dimensional coordinate by adding an elevation). Moreover, in a case where the "Spot A" can be specified by a telephone number, the control unit 101 may receive an input of the telephone number. In a case where the "Spot A" can be specified by a URL or an e-mail address, the control unit 101 may receive an input of the URL or the e-mail address thereof.

Next to Step S32, the control unit 101 obtains the information for authentication when the user gets in the automatic driving vehicle 1 at the Spot A again (Step S33). This process at Step S33 is similar to those at Step S25 and Step S29. In this embodiment, the control unit 101 obtains a face image of the driver as the user as the information for authentication of the re-enter-passenger. Next to Step S33, the control unit 101 then determines completion of the receipt at Step S8 in FIG. 3, and at next Step S9, the control unit 101 stores a selection designation for the selected after-getting-out behavior "go to Spot A" and setup information of the "Spot A" in the storing unit of the aftergetting-out behavior setup receiving unit 118, and stores the "face image of the driver" as the information for authentication of the re-enter-passenger the user authentication information storing unit 115.

In a case where it is determined at Step S31 that the behavior "go to Spot A" is not selected, the control unit 101 determines whether the behavior "go to pick up in response to calling" is selected by the user or (Step S34). In a case where it is determined at Step S34 that the behavior "go to pick up in response to calling" is selected by the user, the control unit 101 informs the user of a message to prompt the user to input the information for authentication of the caller through the display unit 111 (in addition, the control unit 101 may informs the user of it by means of audio through the speaker 136), and receives an input of the information for authentication of the caller from the user (Step S35). In this example, as the information for authentication of the caller, the telephone number of the mobile phone terminal of the caller is inputted.

Next, the control unit 101 obtains the information for authentication when the user gets in the automatic driving vehicle 1 again (Step S36). This process at Step S36 is similar to those at Step S25 and Step S29. In this embodiment, the control unit 101 obtains a face image of the driver as the user as the information for authentication of the re-enter-passenger. Next to Step S36, the control unit 101 determines completion of the receipt at Step S8 in FIG. 3, and at next Step S9, the control unit 101 stores a selection designation for the selected after-getting-out behavior "go to pick up in response to calling" in the storing unit of the after-getting-out behavior setup receiving unit 118, and stores the telephone number of the mobile phone terminal as the information for authentication of the caller in the ca authentication information storing unit 117. In addition, the control unit 101 stores the "face image of the driver" as the information for authentication of the re-enter-passenger in the user authentication information storing unit 115.

In a case where it is determined at Step S34 that the behavior "go to pick up in response to calling" is not selected, the control unit 101 determines whether the behavior "wait at the Spot B" is selected by the user or not (Step S37). In a case where it is determined at Step S37 that the behavior "wait at the Spot B" is selected by the user, the control unit 101 informs the user of a message to prompt the user to input a setup of the "Spot B" through the display unit 111 (in addition, the control unit 101 may informs the user of it by means of audio through the speaker 136), and receives the setup of the "Spot B" from the user (Step S38). At this time, the control unit 101 displays, at Step S38, a map in which the current location is centered on the display screen of the display unit 111, and receives the setup of the "Spot B" on the map. Alternatively, the control unit 101 may receive an input of an address of the "Spot B" by the user, or may present facilities or the like around the current location to receive a selection input from the user. Further, the control unit 101 may receive an input of a two-dimensional coordinate of the "Spot B" consisted of a degree of latitude and a degree of longitude (or a three-dimensional coordinate by adding an elevation). Moreover, in a case where the "Spot B" can be specified by a telephone number, the control unit 101 may receive an input of the telephone number. In a case where the "Spot B" can be specified by a URL or an e-mail address, the control unit 101 may receive an input of the URL or the e-mail address thereof.

Next to Step S38, the control unit 101 obtains the information for authentication when the user gets in the automatic driving vehicle 1 at the Spot B again (Step S39). This process at Step S39 is similar to those at Step S25 and Step S29. In this embodiment, the control unit 101 obtains a face image of the driver as the user as the information for authentication of the re-enter-passenger. Next to Step S39, the control unit 101 then determines completion of the receipt at Step S8 in FIG. 3, and at next Step S9, the control unit 101 stores a selection designation for the selected after-getting-out behavior "wait at the Spot B" and setup information of the "Spot B" in the storing unit of the after-getting-out behavior setup receiving unit 118, and stores the "face image of the driver" as the information for authentication of the re-enter-passenger in the user authentication information storing unit 115.

In a case where it is determined at Step S37 that the behavior "wait at the Spot B" is not selected, the control unit 101 determines whether the behavior "return to getting-off location after predetermined time" is selected by the user or not (Step S41 in FIG. 6). Then, in a case where it is determined at Step S41 that the behavior "return to getting-off location after predetermined time" is selected by the user, the control unit 101 informs the user of a message to prompt the user to input the information for calculating (or estimating) the "predetermined time" (including the direct input of the "predetermined time") through the display unit 111 (in addition, the control unit 101 may informs the user of it by means of audio through the speaker 136), and receives an input of the information for calculating the "predetermined time" (including a direct input of the "predetermined time") though voice input information from the user as described above and the touch panel 112 (Step S42).

Next, the control unit 101 obtains the information for authentication when the user gets in the automatic driving vehicle 1 again (Step S43). The process at Step S43 is similar to those at Step S25 and Step S29. In this embodiment, the control unit 101 obtains, as the information for authentication of the re-enter-passenger, a face image of the driver as the user. Next to Step S43, the control unit 101 determines completion of the receipt at Step S8 in FIG. 3, and at next Step S9, the control unit 101 stores a selection designation for the selected after-getting-out behavior "return to getting-off location after predetermined time" in the storing unit of the after-getting-out behavior setup receiving unit 118, and stores the "face image of the driver" as the information for authentication of the re-enter-passenger in the user authentication information storing unit 115.

In a case where it is determined at Step S41 that the behavior "return to getting-off location after predetermined time" is not selected, the control unit 101 determines whether the behavior "stay at the Spot C after predetermined time" is selected by the user or not (Step S44). In a case where it is determined at Step S44 that the behavior "stay at the Spot C after predetermined time" is selected by the user, the control unit 101 informs the user of a message to prompt the user to input information for calculating (or estimating) the "predetermined time" (including the direct input of the "predetermined time") through the display unit 111 (in addition, the control unit 101 may informs the user of it by means of audio through the speaker 136), and receives the voice input information from the user as described above or the input (including the direct input of the "predetermined time") of the information for calculating the "predetermined time" through the touch panel 112 (Step S45). At Step S45, it is preferable to directly input the "predetermined time" in a case where the "Spot C" is located far away from the getting-off location (current location).

Next, the control unit 101 informs the user of a message to prompt the user to input a setup of the "Spot C" through the display unit 111 (in addition, the control unit 101 may informs the user of it by means of audio through the speaker 136), and receives the setup of the "Spot C" from the user (Step S46). At this time, the control unit 101 displays a map in which the getting-off location (current location) is centered on the display screen of the display unit 111, and receives the setup of the "Spot C" on the map at Step S46. Alternatively, the control unit 101 may receive an input of an address of the "Spot C" from the user, or may present facilities or the like around the current location to receive a selection input from the user. Further, the control unit 101 may receive an input of a two-dimensional coordinate of the "Spot C" consisted of a degree of latitude and a degree of longitude (or a three-dimensional coordinate by adding an elevation). Moreover, in a case where the "Spot C" can be specified by a telephone number, the control unit 101 may receive an input of the telephone number. In a case where the "Spot C" can be specified by a URL or an e-mail address, the control unit 101 may receive an input of the URL or the e-mail address thereof.

Although illustration of Steps in the flowchart is omitted, the control unit 101 can estimate, at the time of receiving the setup of the "Spot C", a time required for the automatic driving vehicle 1 to move from the getting-off location (current location) to the "Spot C", and determine whether the behavior "stay at the Spot C after predetermined time" is temporally possible as the after-getting-out behavior or not. In this case, when the control unit 101 receives a setup of the "Spot C", the control unit 101 causes the car-navi functioning unit 113 to search a route from the getting-off location (current location) to the "Spot C" by using the route searching function, thereby determining the route. Next, the control unit 101 estimates a time required for the automatic driving vehicle 1 to move from the getting-off location (current location) to the "Spot C" on the basis of the route and a traveling speed of the automatic driving vehicle 1. Moreover, the control unit 101 compares this required traveling time thus estimated with the "predetermined time" thus inputted and set up. In a case where the required traveling time is longer than the "predetermined time" on the basis of a comparison result, it is difficult to realize the behavior "stay at the Spot C after predetermined time" as the after-getting-out behavior. For this reason, the control unit 101 informs the user of a message to prompt the user to input the "predetermined time" or the "Spot C" again so that the required traveling time of the automatic driving vehicle 1 becomes shorter than the "predetermined time", and receives re-input of the information. Of course, in a case where the Spot C approaches the getting-off location (current location), there is little need to input the information again.

Subsequently, the control unit 101 obtains the information for authentication when the user gets in the vehicle again at the Spot C (Step S47). This process at Step S47 is similar to those at Step S25 and Step S29. In this embodiment, the control unit 101 obtains, as the information for authentication of the re-enter-passenger, a face image of the driver as the user. Next to Step S47, the control unit 101 determines completion of the receipt at Step S8 in FIG. 3, and at next Step S9, the control unit 101 stores a selection designation for the selected after-getting-out behavior "stay at the Spot C after predetermined time" and setup information of the "Spot C" in the storing unit of the after-getting-out behavior setup receiving unit 118, and stores the "face image of the driver" as the information for authentication of the re-enter-passenger in the user authentication information storing unit 115.

In a case where it is determined at Step S44 that the behavior "stay at the Spot C after predetermined time" is not selected, the control unit 101 determines whether the user carries out an operation to cancel the behavior after getting out from the automatic driving vehicle 1 thus set up or not (Step S48). In a case where it is determined at Step S48 that the user does not carry out the operation to cancel the after-getting-out behavior thus set up, the control unit 101 causes the processing flow to Step S21 in FIG. 4, and repeats the processes after Step S21. Alternatively, in a case where the control unit 101 determines the behavior after getting out from the automatic driving vehicle 1 that the user hopes does not exist in the content stored in the after-getting-out behavior storing unit as shown in FIG. 2, the control unit 101 may prompt the user to input characters (or a text) from the touch panel 112, or prompt the user to input his or her voice through the microphone 135. Further, in a case where such an input is not made even though the user is prompted to input characters or voice, the control unit 101 determines that there is no after-getting-out behavior that the user hopes. The automatic driving vehicle 1 stops the motor driving unit 131 at the location where the driver gets out from the automatic driving vehicle 1, and turns off the power supply while maintaining power feeding to sections necessary as the process during stop. Further, a predetermined behavior in a case where the driver does not set up a behavior after getting out from the automatic driving vehicle 1 may be set up in advance, and the automatic driving vehicle 1 may carry out it. The predetermined behavior set up in advance may become the schedule information.

Further, in a case where it is determined at Step S48 that the user carries out the operation to cancel the after-getting-out behavior thus set up, the control unit 101 terminates this processing routine. In this case, the automatic driving vehicle 1 determines that the driver does not set up a behavior after getting out from the automatic driving vehicle 1. The automatic driving vehicle 1 may stop the motor driving unit 131 at the location where the driver gets out from the automatic driving vehicle 1, and turn off the power supply while maintaining power feeding to sections necessary as the process during stop. Further, a predetermined behavior in a case where the driver does not set up a behavior after getting out from the automatic driving vehicle 1 may be set up in advance, and the automatic driving vehicle 1 may carry out it.

Example of Processing Operation after User Gets Out from the Automatic Driving Vehicle 1 According to the Embodiment Next, an example of a processing operation after the user gets out from the automatic driving vehicle 1 at Step S11 in FIG. 3 will be described. FIG. 7 to FIG. 12 are flowcharts for explaining an example of a flow of control processing operations for each behavior after getting out from the automatic driving vehicle 1, which is executed by the control unit 101 of the electronic control circuit unit 10 in the automatic driving vehicle 1 when the driver gets out from the automatic driving vehicle 1 and the driver is thus absence. This example will be described while supposing the respective processes when a setup for any of the behaviors after getting out from the automatic driving vehicle 1 in the list shown in FIG. 2 is received.

In this regard, a case where a process of each Step in the flowcharts of FIG. 7 to FIG. 12 is also realized by executing programs for the respective processing functions of the behavior control processing unit 120, the user authenticating unit 114, and the caller authenticating unit 116 as software processing by means of the control unit 101 will be described.

The control unit 101 first confirms what the behavior after getting out from the automatic driving vehicle 1 thus set up is (Step S51). The control unit 101 then determines whether the behavior after getting out from the automatic driving vehicle 1 thus set up is a behavior "move to prescribed parking place" as a result of confirmation or not (Step S52). In a case where it is determined at Step S52 that the behavior after getting out from the automatic driving vehicle 1 thus set up is the behavior "move to prescribed parking place", the control unit 101 obtains information on a current location measured by the current location detecting unit 110, and controls the car-navi functioning unit 113 to search a route from the current location to the prescribed parking place thus selected, set up and stored using the route searching function (Step S53). Then, the control unit 101 controls the car-navi functioning unit 113 so as to carry out the route guidance using the route searching result, and controls the automatic driving vehicle 1 so as to move to the prescribed parking place, which is selected, set up and stored, by means of the automatic driving mode (Step S54). When the automatic driving vehicle 1 is parked at an objective parking place, the control unit 101 terminates the behavior control processing after getting out from the automatic driving vehicle 1.

Figure 13:
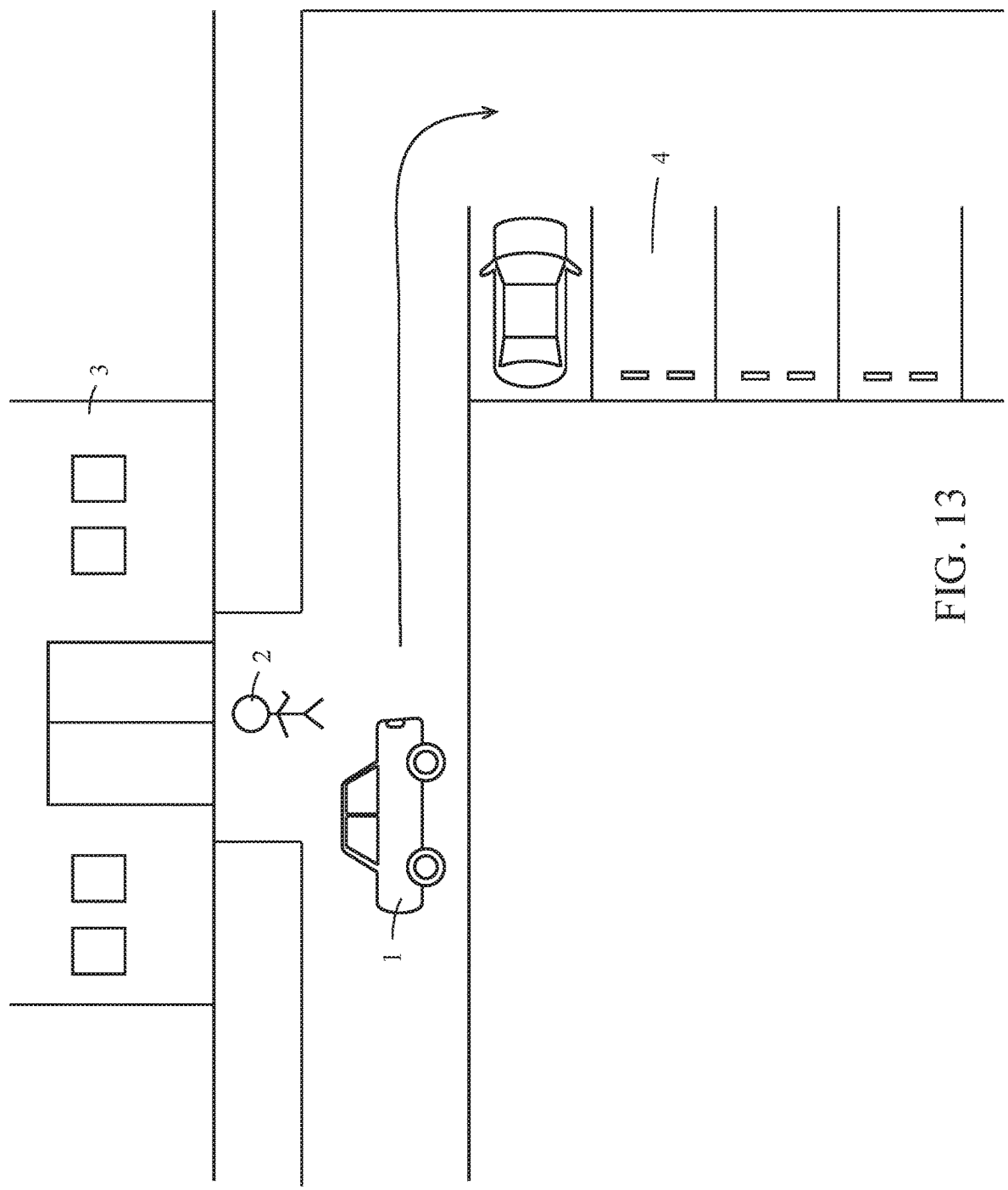
FIG. 13 is a view for explaining a concrete example of the behavior after getting out the vehicle used in the embodiment of the automatic driving vehicle by this invention.

FIG. 13 shows an example of a situation in a case where this behavior "move to prescribed parking place" is set up as the behavior after getting out from the automatic driving vehicle 1. In the example of FIG. 13, when a user 2 who gets in the automatic driving vehicle 1 arrives at an entrance of an apartment 3 in which his or her home exists, a specified parking place of the apartment is designated as prescribed parking place, and the behavior "move to prescribed parking place" is designated as the after-getting-out behavior. Then, the user 2 gets out from the automatic driving vehicle 1, and go home. The automatic driving vehicle 1 receives a setup of a behavior after getting out from the automatic driving vehicle 1 from the user 2. After confirming that the user 2 gets out from the automatic driving vehicle 1; the automatic driving vehicle 1 moves to a specified parking place 4 of the apartment designated as the after-getting-out behavior thus set up by means of the automatic driving mode, and carries out a parking operation. When the parking is completed, the automatic driving vehicle 1 stops the motor driving unit 131, and turns off power supply while maintaining power feeding to sections necessary as the process during stop.

As other example, it is assumed that when the user 2 gets in the automatic driving vehicle 1 and arrives at an entrance of his or her company for attendance, the user 2 sets up the company parking place as the prescribed parking place; sets up the behavior "move to prescribed parking place" as the after-getting-out behavior; gets out from the automatic driving vehicle 1; and enters the inside of a building of the company. In this case, the automatic driving vehicle 1 receives a setup of the after-getting-out behavior from the user 2. After confirming that the user 2 gets out from the automatic driving vehicle 1, the automatic driving vehicle 1 moves to the designated company parking place by means of the automatic driving mode, and carries out a parking operation. When the parking is completed, the automatic driving vehicle 1 stops the motor driving unit 131, and turns off power supply while maintaining power feeding to sections necessary as the process during stop. Similar operations are also carried out in a case where the contracted parking place is designated as the prescribed parking place.

Moreover, as other example, although it has not been cited as the examples in FIG. 2, it is assumed that when the user 2 gets in the automatic driving vehicle 1 and arrives at a accommodation facility such as a hotel for lodgment, the user 2 sets up a parking place dedicated for the accommodation facility as the prescribed parking place; sets up the behavior "move to prescribed parking place" as the after-getting-out behavior; gets out from the automatic driving vehicle 1; and enters the accommodation facility. In this case, the automatic driving vehicle 1 receives a setup of the after-getting-out behavior from the user 2. After confirming that the user 2 gets out from the automatic driving vehicle 1, the automatic driving vehicle 1 moves to a parking place dedicated for the designated accommodation facility by means of the automatic driving mode, and carries out the parking operation. When the parking is completed, the automatic driving vehicle 1 stops the motor driving unit 131, and turns off power supply while maintaining power feeding to sections necessary as a process during stop. In case of the lodgment, the automatic driving vehicle 1 is not used until the next day basically. Therefore, in a case where the user gets in the automatic driving vehicle 1 on the day again in spite of the lodgment, authentication is to be carried out more strictly. This is because there is a possibility of impersonation of the user, or a risk of a trouble. For example, the authentication is carried out by combining plural kinds of information for authentication surely, issuing a warning such as an alarm sound at the time of authentication, photographing a face image of the re-enter-passenger, recording a voice of the caller, or the like. Further, the control unit 101 may carry out the authentication for the user who gets in the automatic driving vehicle 1 again by making a call to the mobile phone terminal of the user through the wireless communication unit 102 and confirming it. Moreover, the control unit 101 may carry out the authentication for the user who gets in the automatic driving vehicle 1 again by making a call to the accommodation facility and confirming it.

Even in a case where it is not the accommodation facility but a leisure facility such as an amusement park or a zoo and a commercial facility such as a shopping center or a department store, the user 2 of the automatic driving vehicle 1 may designate a parking place dedicated for the facility as the prescribed parking place, and carry out the similar operation. In a case where there is a specific facility, such as a hotel, which the user 2 frequently uses, the dedicated parking place may be registered as the prescribed parking place.

Next, in a case where it is determined at Step S52 that the after-getting-out behavior thus set up is not the behavior "move to prescribed parking place", the control unit 101 determines whether the after-getting-out behavior thus set up is the behavior "wait at neighboring parking place until calling" or not (Step S55). In a case where it is determined at Step S55 that the after-getting-out behavior thus set up is the behavior "wait at neighboring parking place until calling", the control unit 101 controls the car-navi functioning unit 113 to carry out peripheral retrieval in which the current location is set to a center location, and detects a neighboring parking place (Step S56).

Next, the control unit 101 obtains information on the current location measured by the current location detecting unit 110, and causes the car-navi functioning unit 113 to search a route from the current location to the neighboring parking place detected at Step S56 by using the route searching function (Step S57). Then, the control unit 101 controls the car-navi functioning unit 113 so as to carry out the route guidance by using the route searching result, and controls the automatic driving vehicle 1 so as to move to the neighboring parking place detected at Step S56 by means of the automatic driving mode (Step S58).

Then, the control unit 101 stops the motor driving unit 131 to set to a waiting state when the automatic driving vehicle 1 is caused to park at the objective parking place. The control unit 101 also monitors the wireless communication unit 102, and determines whether a calling (or incoming) is received or not (Step S59). In this case, in a case where the objective parking place is full, the control unit 101 of course carries out the peripheral retrieval for another parking place again, and causes the automatic driving vehicle 1 to move to the detected parking place. In this regard, it goes without saying that a waiting place may not be a parking place, but a place that can play the similar role so long as it has a space in which the automatic driving vehicle 1 can be parked.

Figure 8:
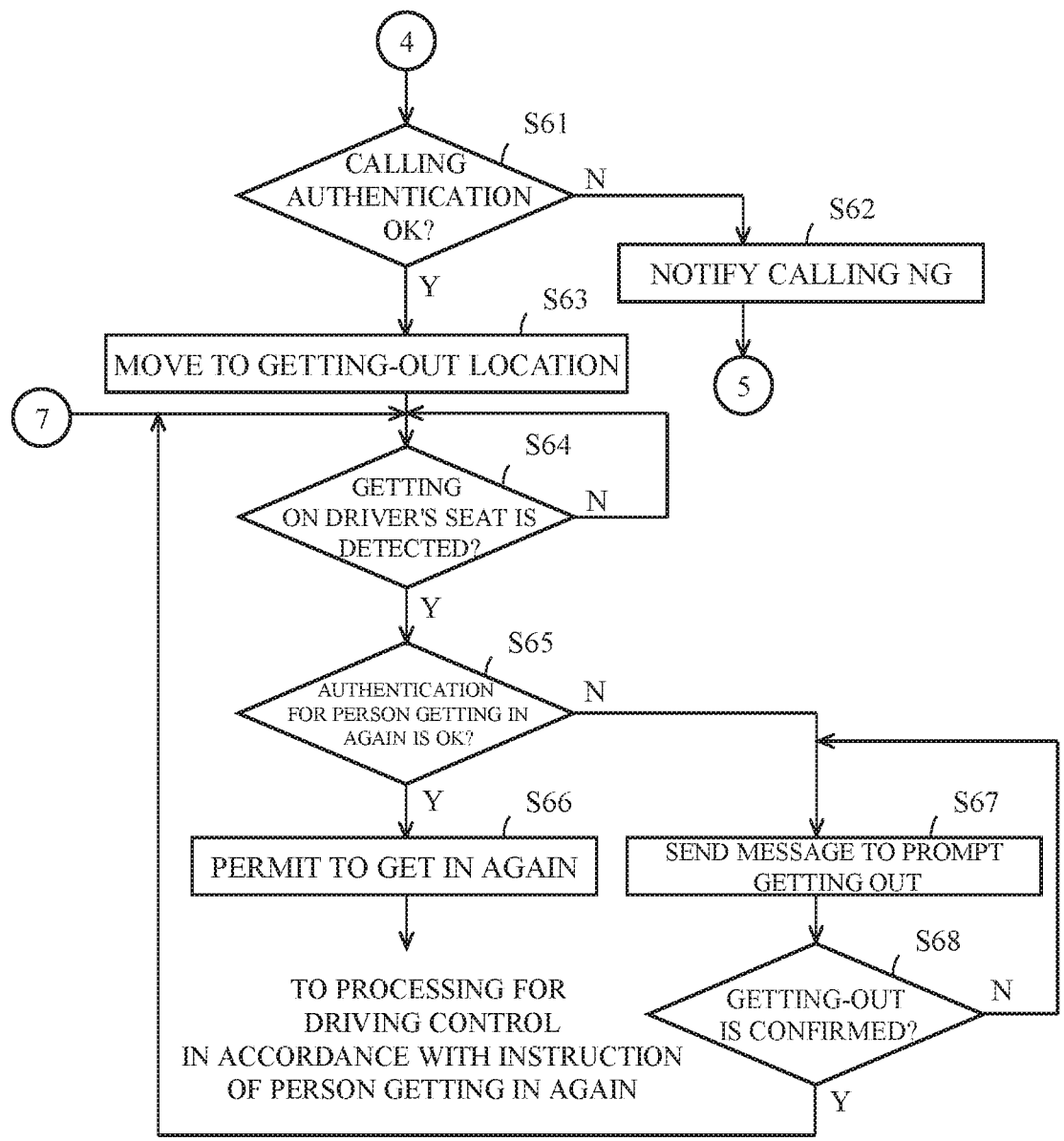
FIG. 8 is a view showing a part of the flowchart that shows an example of a flow of a processing operation for a behavior after getting out from the vehicle according to the embodiment of the automatic driving vehicle by this invention.

In a case where it is determined at Step S59 that the calling is received, the control unit 101 checks the incoming telephone number of the mobile phone terminal with the telephone number of the mobile phone terminal stored in the caller authentication information storing unit 117, and determines whether authentication of the caller is OK or not (Step S61 in FIG. 8).

In a case where it is determined at Step S61 that the authentication for the caller is not OK, the control unit 101 transmits a voice message of calling NG to a destination from which the calling is received through the wireless communication unit 102 (Step S62). Then, the control unit 101 causes the processing flow to return to Step S59 in FIG. 7. Further, in a case where it is determined at Step S61 that the authentication for the caller is OK, the control unit 101 controls the car-navi functioning unit 113 so as to carry out the route guidance by reversely traveling on the route searched at Step S57, and causes the automatic driving vehicle 1 to move from the parking place at the current location to the original getting-off location by means of the automatic driving mode (Step S63).

Then, the control unit 101 determines whether the user gets on the driver's seat or not by monitoring the door sensor, the seating sensor consisting of the weight sensor and/or the pressure sensor, the touch sensor configured to determine whether a person touches the handle or the touch panel 112 or not, photographed images of the camera configured to photograph the driver on the driver's seat of the group of cameras 107, presence or absence of a voice of the driver on the driver's seat collected by the microphone 135, for example (Step S64). In a case where it is determined at Step S64 that the user gets on the driver's seat, the control unit 101 refers to and compares the face image as the information for authentication of the re-enter-passenger, which is stored in the user authentication information storing unit 115, and the face image obtained by photographing the driver who gets in the automatic driving vehicle 1 by means of the camera. The control unit 101 determines whether authentication for the re-enter-passenger is OK or not by determining whether both of the face images coincide with each other or not (Step S65).

In a case where it is determined at Step S65 that the authentication for the re-enter-passenger is not OK, the control unit 101 causes the display unit 111 to display a message to prompt the re-enter-passenger to get out from the automatic driving vehicle 1 on the display screen because authentication for the re-enter-passenger is impossible, and outputs a sound corresponding to the message through the speaker 136, and prompts the re-enter-passenger to get out from the automatic driving vehicle 1 (Step S67). Then, the control unit 101 monitors the door sensor, the seating sensor, the touch sensor, the photographed image of the camera, the voice collected by the microphone 135, and the like to determine whether the passenger get out from the automatic driving vehicle 1 or not (Step S68). In a case where it is determined that the passenger gets out from the automatic driving vehicle 1 and does not exist therein, the control unit 101 causes the processing flow to return to Step S67. Further, in a case where it is determined at Step S68 that the passenger get out from the automatic driving vehicle 1, the control unit 101 causes the processing flow to return to Step S64, and repeats the processes after Step S64.

In this regard, in a case where it is determined at Step S65 that the authentication for the re-enter-passenger is not OK, there may be a possibility of a suspicious person. For this reason, the control unit 101 may not only prompt the re-enter-passenger to get out from the automatic driving vehicle 1 like that at Step S67, but also contact the mobile phone terminal of the most recently get-out person or an owner of the automatic driving vehicle 1 regarding a possibility of a suspicious person by means of the telephone or the e-mail. In case of contacting the mobile phone terminal by means of e-mail, the face image obtained by photographing by means of the camera and used for the authentication of the re-enter-passenger may be attached. Of course, a driving operation of the automatic driving vehicle 1 is impossible until the most recently get-out person or the owner of the automatic driving vehicle 1 permits the authentication. Moreover, in a case where it is determined that the possibility of the suspicious person is extremely high, the automatic driving vehicle 1 may report the trouble to the police.

Further, in a case where it is determined at Step S65 that the authentication for the re-enter-passenger is OK, the control unit 101 permits the driver who gets in the automatic driving vehicle 1 to get therein again (Step S66), and then, shifts to a processing routine for a driving control mode according to an instruction of the driver (re-enter-passenger).

Figure 7:
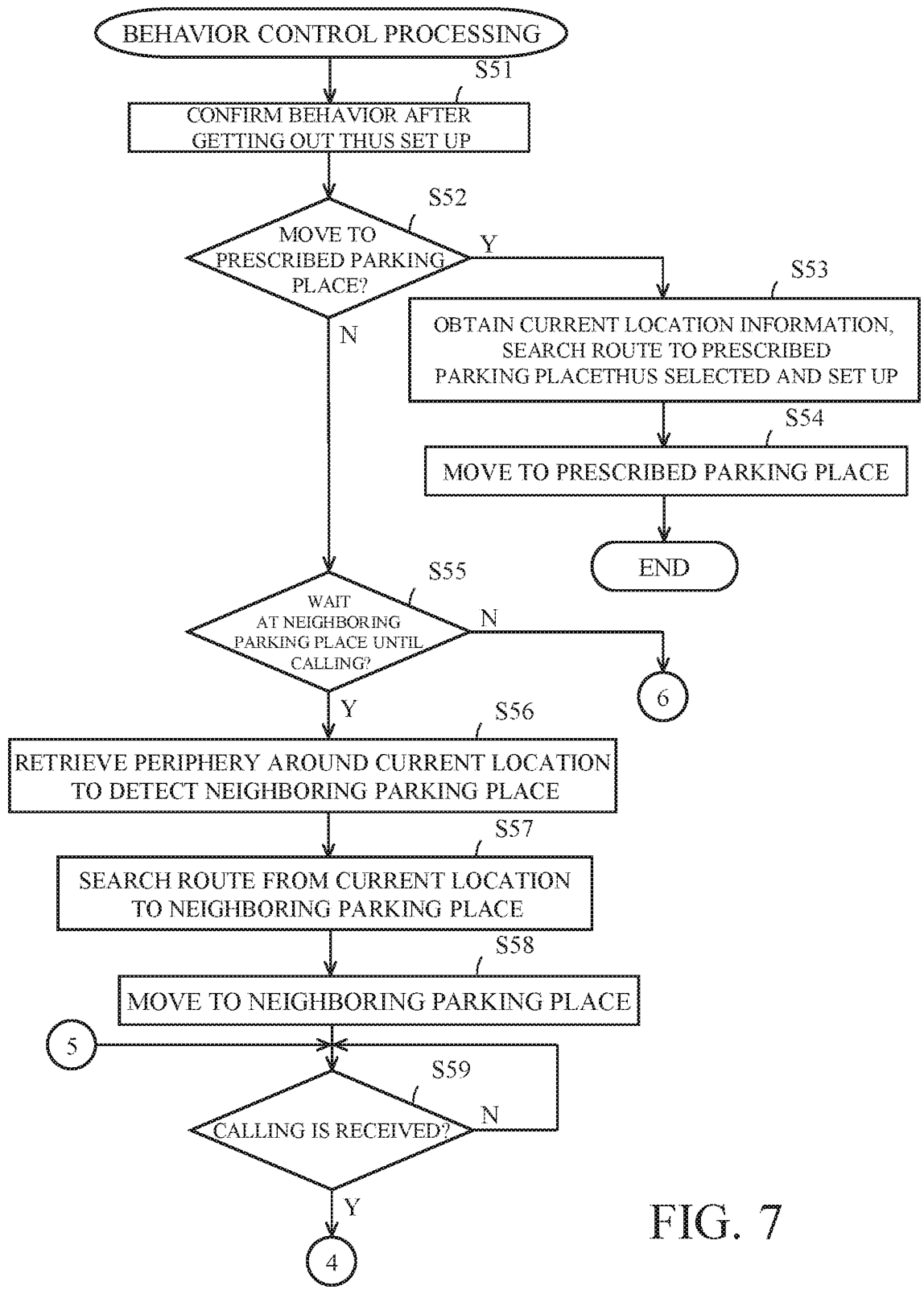
FIG. 7 is a view showing a part of a flowchart that shows an example of a flow of a processing operation for a behavior after getting out from the vehicle according to the embodiment of the automatic driving vehicle by this invention.
Figure 9:
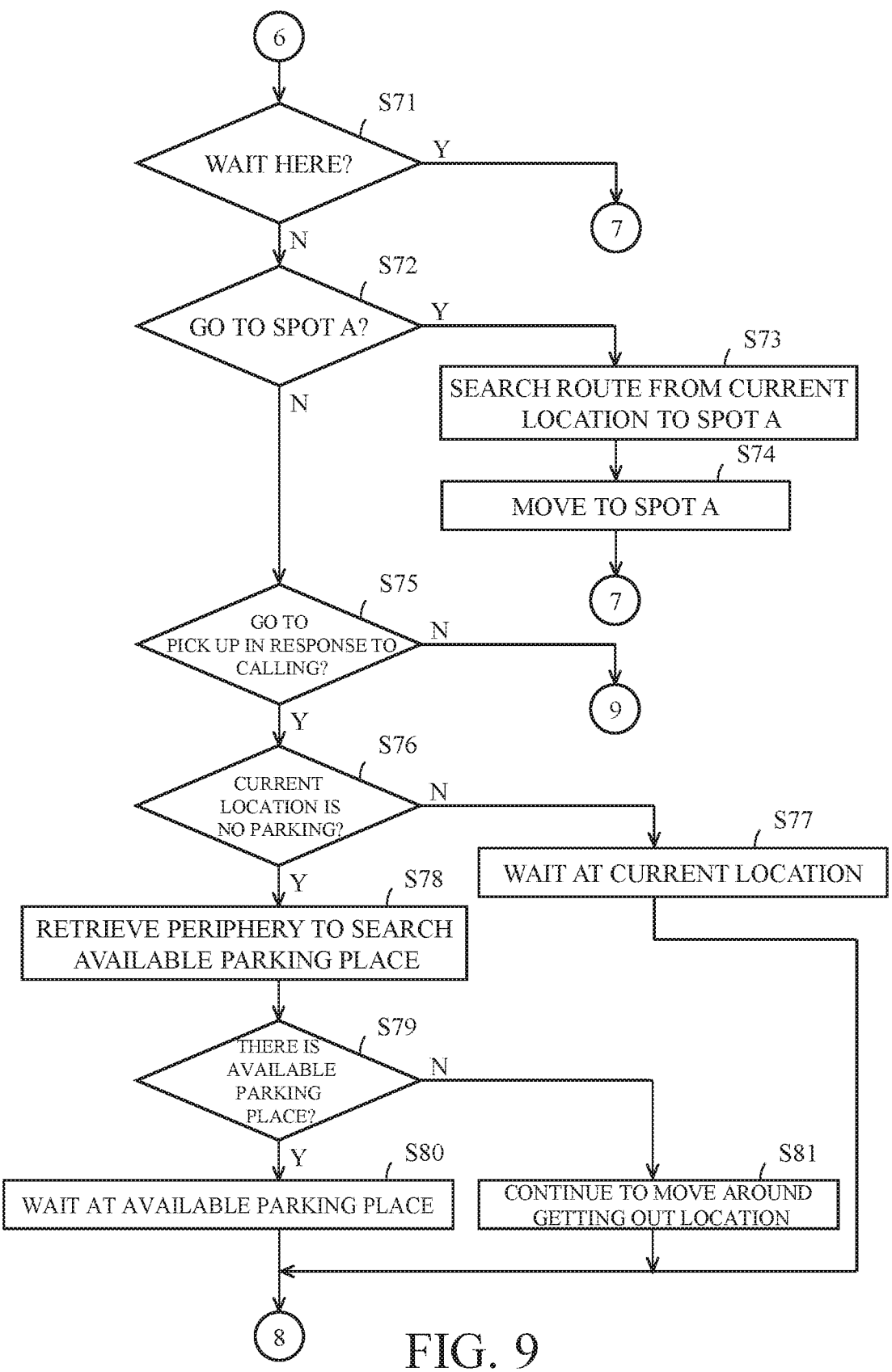
FIG. 9 is a view showing a part of the flowchart that shows an example of a flow of a processing operation for a behavior after getting out from the vehicle according to the embodiment of the automatic driving vehicle by this invention.

In a case where it is determined at Step S55 in FIG. 7 that the after-getting-out behavior thus set up is not the behavior "wait at neighboring parking place until calling", the control unit 101 determines whether the after-getting-out behavior thus set up is the behavior "wait here" or not (Step S71 in FIG. 9). In a case where it is determined at Step S71 that the after-getting-out behavior thus set up is the behavior "wait here", the control unit 101 stops the motor driving unit 131 to set the automatic driving vehicle 1 to a waiting state. In addition, the control unit 101 causes the processing flow to proceed to Step S64 in FIG. 8, and monitors whether the user gets in the automatic driving vehicle 1 again. The control unit 101 repeats the processes after Step S64.

Further, in a case where it is determined at Step S71 that the after-getting-out behavior thus set up is not the behavior "wait here", the control unit 101 determines whether the after-getting-out behavior thus set up is the "go to Spot A" or not (Step S72). In a case where it is determined at Step S72 that the after-getting-out behavior thus set up is the behavior "go to Spot A", the control unit 101 obtains information on the current location measured by the current location detecting unit 110, and causes the car-navi functioning unit 113 to search a route from the current location to the Spot A, which is set up and stored, by using the route searching function (Step S73). Then, the control unit 101 controls the car-navi functioning unit 113 to carry out the route guidance by using the route searching result, and controls the automatic driving vehicle 1 so as to move to the Spot A by means of the automatic driving mode (Step S74).

Next to Step S74, the control unit 101 causes the processing flow to proceed to Step S64 in FIG. 8, and monitors whether the user gets in the automatic driving vehicle 1 again at the Spot A or not. The control unit 101 then repeats the processes after Step S64.

Next, in a case where it is determined at Step S72 that the after-getting-out behavior thus set up is not the behavior "go to Spot A", the control unit 101 determines whether the after-getting-out behavior thus set up is the behavior "go to pick up in response to calling" or not (Step S75). In a case where it is determined at Step S75 that the after-getting-out behavior thus set up is the behavior "go to pick up in response to calling", the control unit 101 determines whether the current location is a no parking plate not (Step S76). Whether the current location is a no parking place or not is determined by recognizing whether there is a sign or marking for no parking or not on the basis of the photographed images of the camera configured to photograph the surroundings thereof of the group of cameras 107.

In a case where it is determined at Step S76 that the current location is not a no parking place, the control unit 101 stops the motor driving unit 131 and wait at the current location while being in a state where calling from the user can be received (Step S77). Further, in a case where it is determined at Step S76 that the current location is a no parking place, the control unit 101 controls the car-navi functioning unit 113 to carry out peripheral retrieval in which the current location is set to a center location, and search a neighboring available parking place (Step S78).

Then, the control unit 101 determines whether there is a neighboring available parking place or not on the basis of a result of the search at Step S78 (Step S79). In a case where it is determined that there is a neighboring available parking place, the control unit 101 causes the car-navi functioning unit 113 to search a route to the available parking place, and to guide the route. Thus, the control unit 101 causes the automatic driving vehicle 1 to move to the available parking place by means of the automatic driving mode, and stops the motor driving unit 131 and wait here while being in a state where calling from the user can be received (Step S80).

In a case where it is determined at Step S79 that any neighboring available parking place is not found, the control unit 101 continues to move the automatic driving vehicle 1 within a range of a peripheral area in which the getting-off location of the user is centered, and waits for calling from the user (Step S81).

Figure 10:
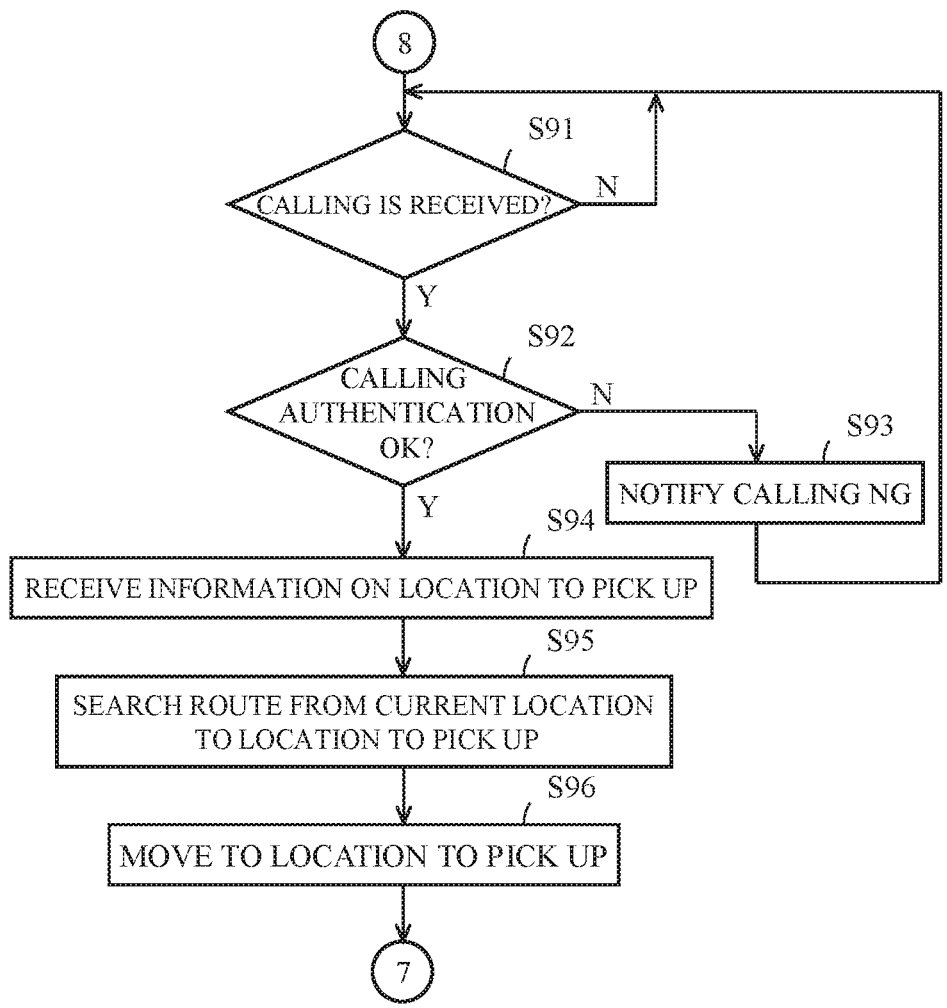
FIG. 10 is a view showing a part of the flowchart that shows an example of a flow of a processing operation for a behavior after getting out from the vehicle according to the embodiment of the automatic driving vehicle by this invention.

Next to Step S77, Step S80 or Step S81, the control unit 101 monitors whether calling from the user is received or not, and waits for the calling (Step S91 in FIG. 10). In a case where it is determined at Step S91 that the calling is received, the control unit 101 determines whether the authentication for the caller is OK or not in the similar manner to that at Step S61 (Step S92).

In a case where it is determined at Step S92 that the authentication for the caller is not OK, the control unit 101 transmits a voice message for calling NG to a destination from which the calling is received through the wireless communication unit 102 (Step S93). Then, the control unit 101 causes the processing flow to return to Step S91. Further, in a case where it is determined at Step S92 that the authentication for the caller is OK, the control unit 101 generates a voice message to request the destination, from which the calling is received, to transmit positional information of the place where the automatic driving vehicle 1 is to go to pick up by means of voice synthesis, and transmit it to the destination. The control unit 101 then obtains the positional information of the place where the automatic driving vehicle 1 is to go to pick up, which is transmitted from the destination in response to this (Step S94).

Then, the control unit 101 obtains the information on the current location measured by the current location detecting unit 110, and causes the car-navi functioning unit 113 to search a route from the current location to the pick-up place obtained at Step S94 using the route searching function (Step S95). Then, the control unit 101 controls the car-navi functioning unit 113 so as to carry out the route guidance using the route searching result, and controls the automatic driving vehicle 1 so as to move to the pick-up place obtained at Step S94 by means of the automatic driving mode (Step S96). Then, the control unit 101 causes the processing flow to proceed to Step S64 in FIG. 8, and monitors whether the user gets in the automatic driving vehicle 1 again or not. The control unit 101 repeats the processes after Step S64.

Figure 11:
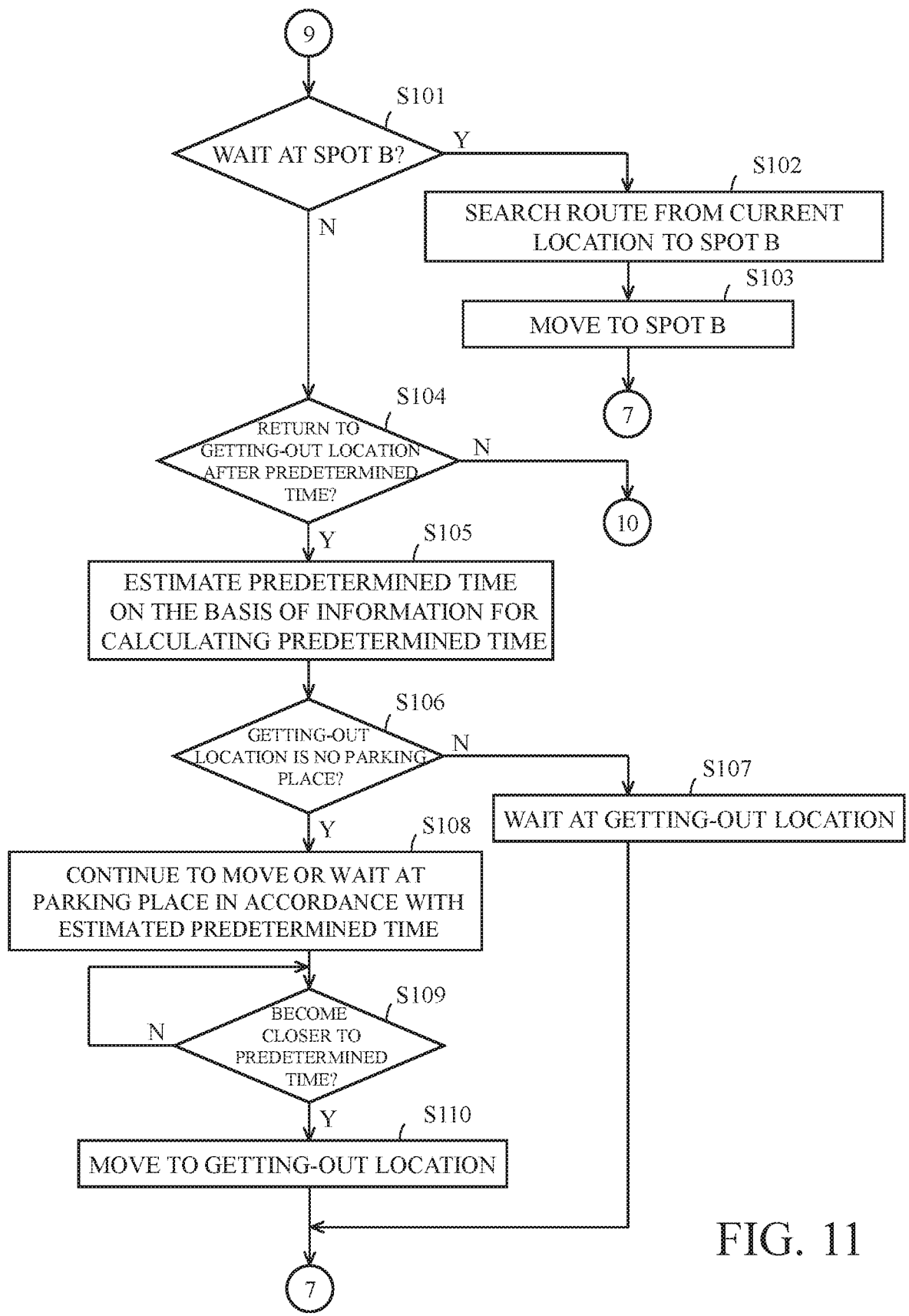
FIG. 11 is a view showing a part of the flowchart that shows an example of a flow of a processing operation for a behavior after getting out from the vehicle according to the embodiment of the automatic driving vehicle by this invention.

Next, in a case where it is determined at Step S75 in FIG. 9 that the after-getting-out behavior thus set up is not the behavior "go to pick up in response to calling", the control unit 101 determines whether the after-getting-out behavior thus set up is the behavior "wait at the Spot B" or not (Step S101 in FIG. 11). In a case where it is determined at Step S101 that the after-getting-out behavior thus set up is the behavior "wait at the Spot B", the control unit 101 obtains the information on the current location measured by the current location detecting unit 110, and causes the car-navi functioning unit 113 to search a route from the current location to the Spot B thus set up and stored by using the route searching function (Step S102). Then, the control unit 101 controls the car-navi functioning unit 113 so as to carry out the route guidance using the route searching result, and controls the automatic driving vehicle 1 so as to move to the Spot B by means of the automatic driving mode (Step S103). Next to Step S103, the control unit 101 causes the processing flow to proceed to Step S64 in FIG. 8, and monitors whether the user gets in the automatic driving vehicle 1 again. The control unit 101 repeats the processes after Step S64.

Next, in a case where it is determined at Step S101 that the after-getting-out behavior thus set up is not the behavior "wait at the Spot B", the control unit 101 determines whether the after-getting-out behavior thus set up is the behavior "return to getting-off location after predetermined time" or not (Step S104). In a case where it is determined at Step S104 that the after-getting-out behavior thus set up is the behavior "return to getting-off location after predetermined time", the control unit 101 estimates the predetermined time on the basis of the information for measuring the stored predetermined time (Step S105).

Next, the control unit 101 determines whether the getting-off location (current location) is a no parking place or not (Step S106). Whether the getting-off location is a no parking place or not is determined by recognizing whether there is a sign or marking for no parking or not on the basis of the photographed images of the camera configured to photograph the surroundings thereof of the group of cameras 107. In a case where it is determined at Step S106 that the getting-off location is not a no parking place, the control unit 101 stops the motor driving unit 131 and waits at the getting-off location (current location) (Step S107).

Further, in a case where it is determined at Step S106 that the getting-off location is a no parking place, the control unit 101 continues to move the automatic driving vehicle 1 by going around a peripheral area of the getting-off location (current location) for the predetermined time estimated at Step S105. Alternatively, the control unit 101 controls the car-navi functioning unit 113 to carry out peripheral retrieval in which the getting-off location (current location) is set to a center location, and searches a neighboring available parking place. The control unit 101 causes the automatic driving vehicle 1 to move the parking place detected as a result of the search, and waits here for the predetermined time estimated at Step S105 (Step S108). In this regard, in a case where the predetermined time is a predetermined threshold value (for example, 20 minutes) or shorter at Step S108, the control unit 101 may continue to move the automatic driving vehicle 1. In a case where the predetermined time is more than the predetermined threshold value, the control unit 101 may search a parkable place such as a parking place, move the automatic driving vehicle 1 to the parkable place, and wait here.

Next to Step S108, the control unit 101 then monitors whether it becomes near the predetermined time estimated at Step S105 or not (Step S109). In a case where it is determined that it becomes near the predetermined time, the automatic driving vehicle 1 controls the car-navi functioning unit 113 to return to the getting-off location using the route guidance (Step S110). Next to Step S107 or Step S110, the control unit 101 causes the processing flow to proceed to Step S64, and monitors whether the user gets in the automatic driving vehicle 1 again. The control unit 101 repeats the processes after Step S64.

Figure 14:
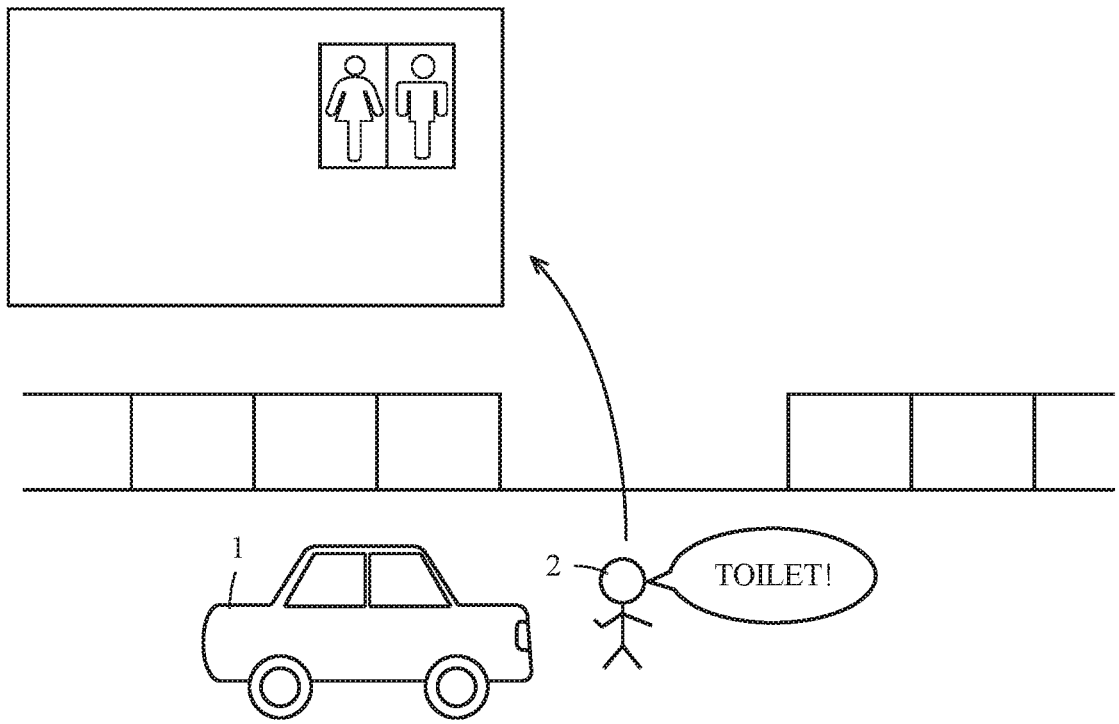
FIG. 14 is a view for explaining a concrete example of the behavior after getting out the vehicle used in the embodiment of the automatic driving vehicle by this invention.

FIG. 14 shows an example of a situation of a case where this behavior "return to getting-off location after predetermined time" is set up as the behavior after getting out from the automatic driving vehicle 1. FIG. 14 shows an example of a situation in which a driver 2 of the automatic driving vehicle 1 has a desire to urinate or defecate and stops at a toilet of a park or the like. In this case, at the time of getting out from the automatic driving vehicle 1, the driver 2 inputs a voice "toilet" to the microphone 135, for example, sets up a behavior after getting out from the automatic driving vehicle 1, and then gets out from the automatic driving vehicle 1. The control unit 101 of the automatic driving vehicle 1 recognizes the voice "toilet" inputted by the driver 2, estimates the predetermined time as five minutes in this example, and waits at the place. Then, the control unit 101 carries out authentication for the driver who returns within a predetermined time or a time slightly longer than the predetermined time, which is in an allowable range, and gets in the automatic driving vehicle 1 again, thereby permitting the driver 2 to get therein again. In this regard, in a case where the driver 2 does not have a desire to urinate but has a desire to defecate, the driver 2 may input a voice "toilet stool" or the like, whereby the control unit 101 may estimate the predetermined time so as to be longer, for example, ten minutes. Further, in a case where the driver 2 is a female, the control unit 101 may estimate a longer predetermined time than the case of a male.

Figure 15:
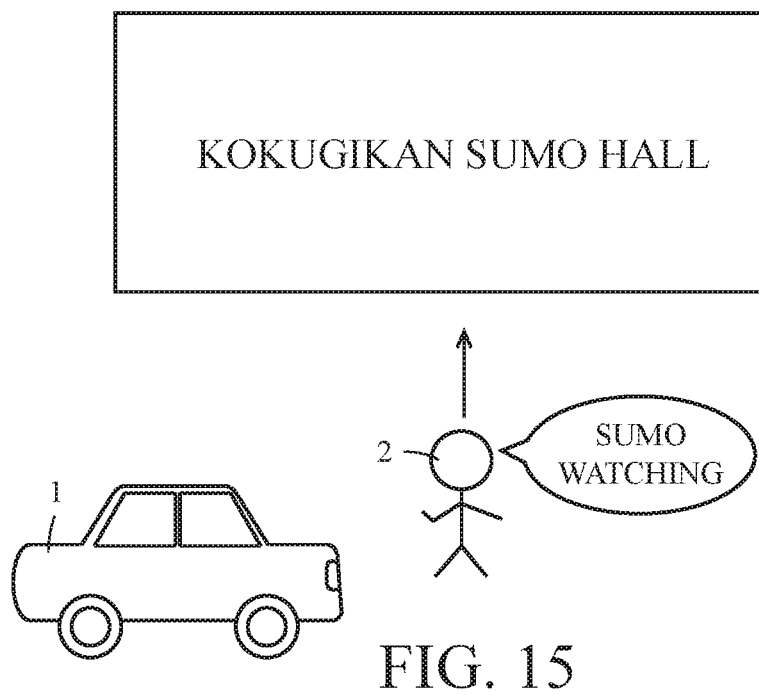
FIG. 15 is a view for explaining a concrete example of the behavior after getting out the vehicle used in the embodiment of the automatic driving vehicle by this invention.

Further, FIG. 15 shows an example of a case where the driver 2 of the automatic driving vehicle 1 visits Ryogoku Kokugikan, for example, for watching a grand sumo tournament by means of the automatic driving vehicle 1. At the time of getting out from the automatic driving vehicle 1, the driver 2 inputs a voice "grand sumo tournament watching" to the microphone 135 to set up an after-getting-out behavior, and gets out from the automatic driving vehicle 1. The control unit 101 of the automatic driving vehicle 1 determines that a grand sumo tournament (Honbasho) is terminated at 6 pm; estimates a predetermined time; and causes the automatic driving vehicle 1 to move to and wait at a parking place of the Kokugikan or a vacant parking place around it, for example. When it becomes 6 pm, the control unit 101 controls the automatic driving vehicle 1 to move to a gateway of the Kokugikan in order to pick up the driver 2.

Figure 12:
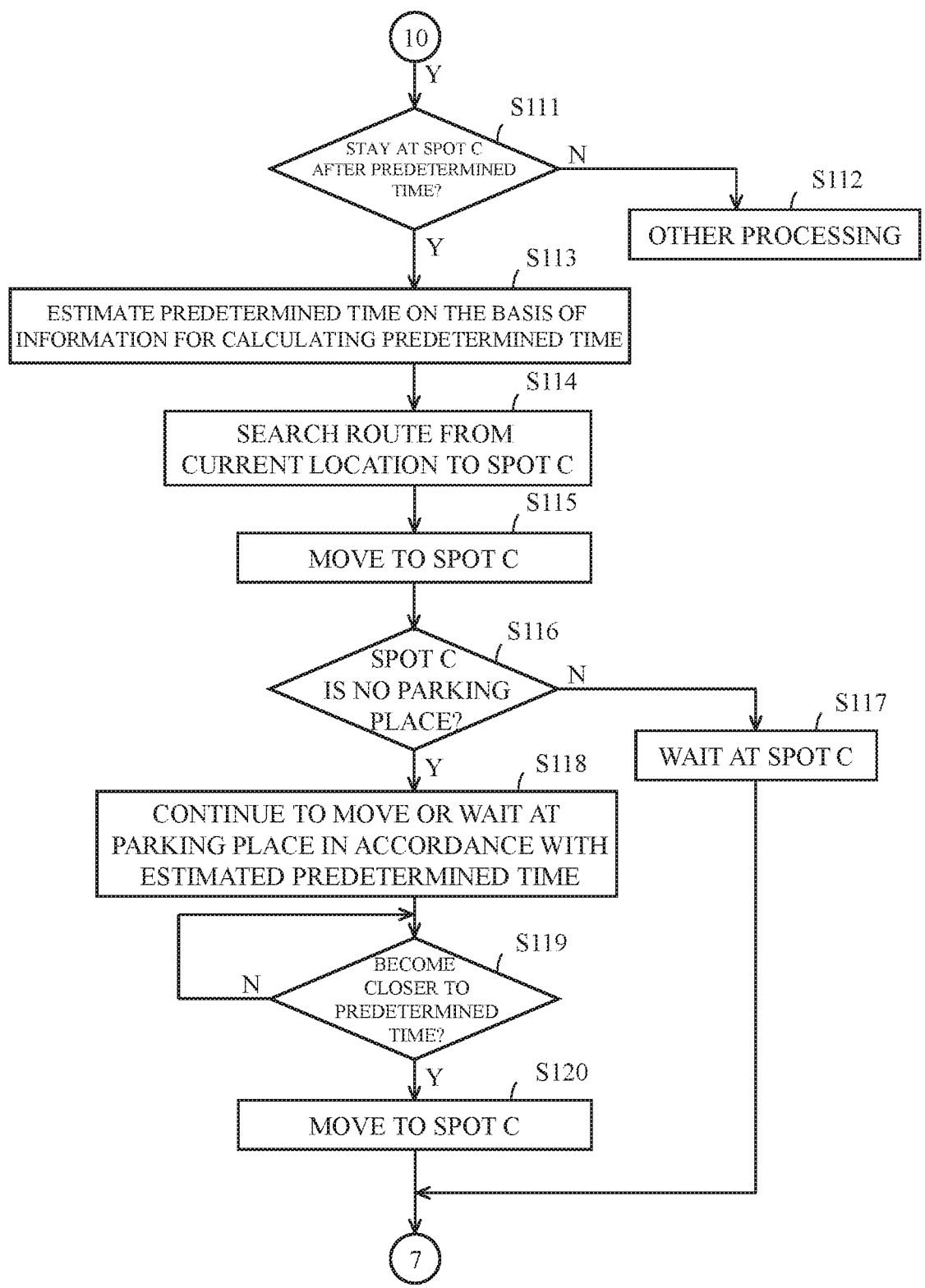
FIG. 12 is a view showing a part of the flowchart that shows an example of a flow of a processing operation for a behavior after getting out from the vehicle according to the embodiment of the automatic driving vehicle by this invention.

Next, in a case where it is determined at Step S104 that the after-getting-out behavior thus set up is not the behavior "return to getting-off location after predetermined time", the control unit 101 determines whether the after-getting-out behavior thus set up is the behavior "stay at the Spot C after predetermined time" or not (Step S111 in FIG. 12). In a case where it is determined at Step S111 that the after-getting-out behavior thus set up is not the behavior "stay at the Spot C after predetermined time", the control unit 101 the processing flow to shift to a processing routine for other behavior after getting out from the automatic driving vehicle 1 (Step S112).

In a case where it is determined at Step S111 that the after-getting-out behavior thus set up is the behavior "stay at the Spot C after predetermined time", the control unit 101 estimates the predetermined time on the basis of information measuring the stored predetermined time (Step S113).

Next, the control unit 101 obtains the information on the current location measured by the current location detecting unit 110, and causes the car-navi functioning unit 113 to search a route from the current location to the Spot C thus set up and stored by using the route searching function (Step S114). Then, the control unit 101 controls the car-navi functioning unit 113 so as to carry out the route guidance using route searching result, and controls the automatic driving vehicle 1 so as to move to the Spot C by means of the automatic driving mode (Step S115).

Next, the control unit 101 determines whether the Spot C is a no parking place or not (Step S116). Whether the Spot C is a no parking place or not is determined by recognizing whether there is a sign or marking for no parking or not on the basis of the photographed images of the camera configured to photograph the surroundings thereof of the group of cameras 107. In a case where it is determined at Step S116 that the Spot C is not a no parking place, the control unit 101 stops the motor driving unit 131 and waits at the Spot C while being in a state where calling from the user can be received (Step S117).

Further, in a case where it is determined at Step S116 that the Spot C is a no parking place, the control unit 101 continues to move the automatic driving vehicle 1 by going around a peripheral area of the Spot C for the predetermined time estimated at Step S113 in the similar manner to that at Step S108. Alternatively, the control unit 101 controls the car-navi functioning unit 113 to carry out peripheral retrieval in which the Spot C is set to a center location, and searches a neighboring available parking place. The control unit 101 causes the automatic driving vehicle 1 to move to the parking place detected as a result of the search, and waits here for the predetermined time estimated at Step S113 (Step S118).

Next to Step S118, the control unit 101 then monitors whether it becomes a time near the predetermined time estimated at Step S113 or not (Step S119). In a case where it is determined that it becomes the time near the predetermined time, the control unit 101 controls the car-navi functioning unit 113 to carry out the route guidance so as to move to the Spot C (Step S120). Next to Step S117 or Step S120, the control unit 101 causes the processing flow to proceed to Step S64 in FIG. 8, and to repeat the processes after Step S64 while monitoring whether the user gets in the automatic driving vehicle 1 again or not.

In the embodiment described above, the automatic driving vehicle 1 is provided with the automatic driving mode and the manual driving mode. However, at the time of unmanned driving in which no driver gets therein like the operation at S11, the automatic driving vehicle 1 carries out the autonomous traveling composed of only the automatic driving mode. In this case, the manual/automatic driving mode switching control unit 105 and the manual driving operation detecting unit 133 are turned off (made ineffective).

Figure 16:
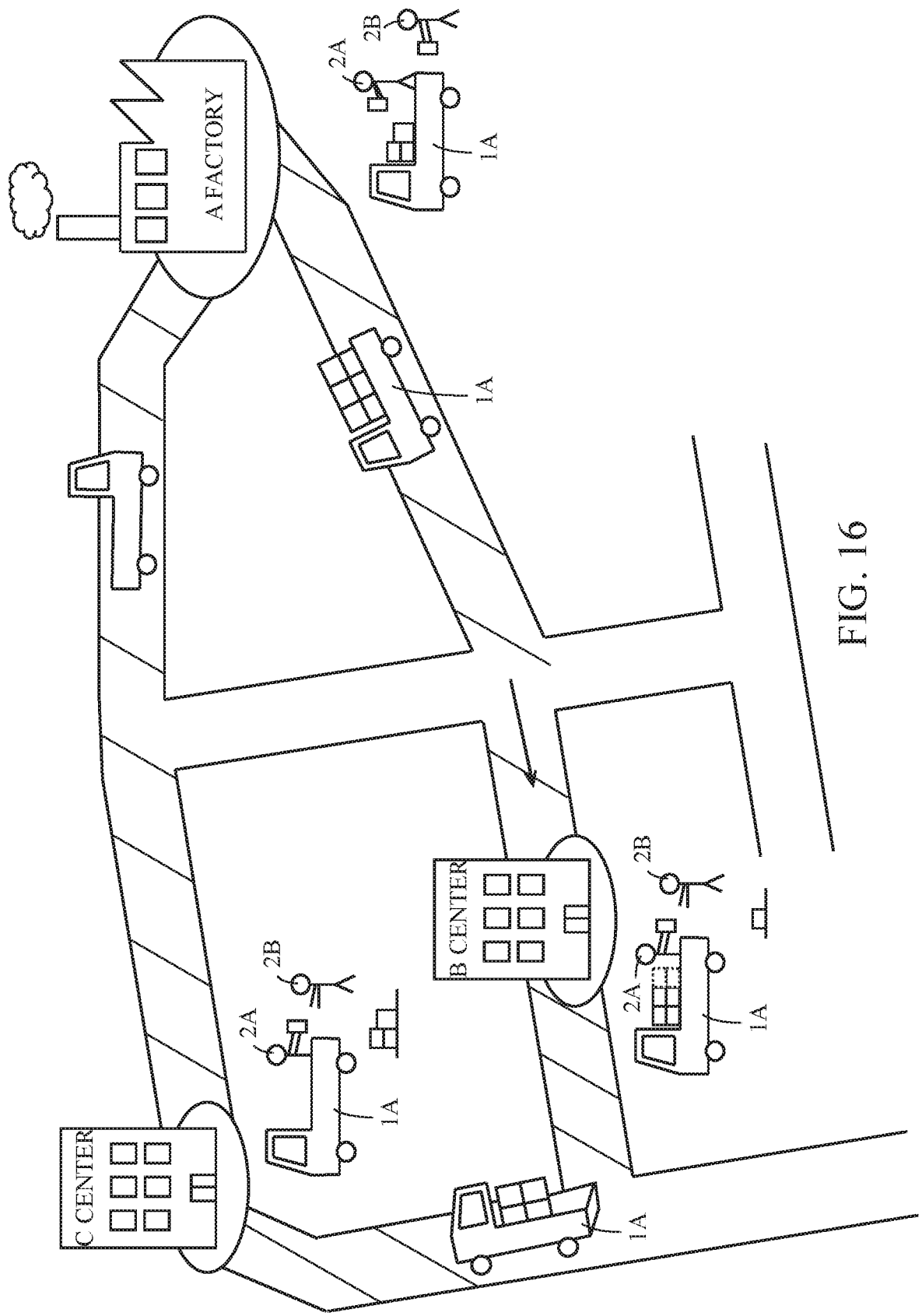
FIG. 16 is a view for explaining a concrete example of the behavior after getting out the vehicle used in the embodiment of the automatic driving vehicle by this invention.

Further, in the embodiment described above, the case where all of the automatic driving vehicles 1 is used as personal use is assumed. However, the case where the automatic driving vehicles 1 is used as business use is also of course assumed. FIG. 16 shows an example of a situation in which a behavior after getting out from the automatic driving vehicle 1 is assumed as this business use. An automatic driving vehicle 1A in the example of FIG. 16 is not a vehicle for personal use, but an example of the case of a delivery truck of a company that owns an A factory.

In this example of FIG. 16, products (or goods) manufactured in the A factory are loaded on the automatic driving vehicle 1A to be carried to a B center. A part of the products loaded on the automatic driving vehicle 1 is unloaded at the B center. Then, the automatic driving vehicle 1 is caused to move from the B center to a C center, and all of the remaining products loaded on the automatic driving vehicle 1 is unloaded at the C center. When unloading of all of the products is terminated at the C center, the automatic driving vehicle 1 is caused to return to the A factory. In this regard, positional information on the A factory, the B center, and the C center is registered and stored in advance in the automatic driving vehicle 1A.

In the example of FIG. 16, operators 2A and 2B for unloading gets in the automatic driving vehicle 1A composed of the delivery truck to move. In this case, any of the operators 2A, 2B gets on a driver's seat, and the other gets on a front passenger seat. In this regard, any of the operators 2A, 2B inputs a setup of the after-getting-out behavior at the time of getting out from the automatic driving vehicle 1A. However, any of the operators 2A, 2B does not necessarily get on the driver's seat. In this embodiment, the automatic driving vehicle 1A is configured to always move by means of the automatic driving mode.

For example, the operators 2A, 2B first get in the automatic driving vehicle 1A, and the automatic driving vehicle 1A moves from a garage to the A factory. When the automatic driving vehicle 1A arrives at the A factory, each of the operators 2A, 2B selects and sets up a behavior "wait at the current location until there is a movement instruction, and move to the B center in a case where there is a movement instruction" as the after-getting-out behavior. Then, the operators 2A, 2B load the products in the automatic driving vehicle 1A, and gets in the automatic driving vehicle 1A again. The automatic driving vehicle 1A carries out user authentication for both or one of the operators 2A, 2B. In a case where it is determined that the user authentication is OK, the automatic driving vehicle 1A waits for a movement instruction of any of the operators 2A, 2B on the basis of the after-getting-out behavior thus set up. In a case where it is determined that the movement instruction is made, the automatic driving vehicle 1A goes to the B center from the A factory by means of the automatic driving mode.

When the automatic driving vehicle 1A arrives at the B center, any of the operators 2A, 2B selects and sets up a behavior "wait at the current location until there is a movement instruction, and move to the C center in a case where there is a movement instruction" as the after-getting-out behavior. Then, the operators 2A, 2B unload a part of the products, which is to be delivered to the B center, of the products loaded on the automatic driving vehicle 1A from the automatic driving vehicle 1A. Then, the operators 2A, 2B get in the automatic driving vehicle 1A again. The automatic driving vehicle 1A carries out user authentication for both or one of the operators 2A, 2B. In a case where it is determined that the authentication is OK, the automatic driving vehicle 1A goes to the C center from B center by means of the automatic driving mode on the basis of the after-getting-out behavior thus set up in response to a movement instruction by any of the operators 2A, 2B.

When the automatic driving vehicle 1A arrives at the C center, any of the operators 2A, 2B selects and sets up, as the behavior after getting out from the automatic driving vehicle 1A, "wait at the current location until there is a movement instruction, and return to the A factory in a case where there is a movement instruction". Then, the operators 2A, 2B unload all of the remaining products loaded on the automatic driving vehicle 1A from the automatic driving vehicle 1A. The the operators 2A, 2B get in the automatic driving vehicle 1A again. The automatic driving vehicle 1A carries out user authentication for both or one of the operators 2A, 2B. In a case where it is determined that the authentication is OK, the automatic driving vehicle 1A moves to the A factory on the basis of the after-getting-out behavior thus set up in response to a movement instruction by any of the operators 2A, 2B.

In this example, the number of operators is two, but the number of operators may be one or three or more. Further, a part or all of the operators may be exchanged at the B center or the C center, or this operation can be carried out in an unmanned manner. Of course, the number of factories and the number of centers are not limited to this example. Further, the number of delivery trucks may be the plural number.

Moreover, even in a case where a delivery route and/or a work procedure is determined in advance, they can be set up as a default. Further, the after-getting-out behavior set up as a default in accordance with a status of a burden on the day, the number of operators and a status thereof, or weather can be changed as occasion may demand when the operator gets out from the automatic driving vehicle 1A. For example, the delivery route and/or the work procedure can be changed.

Effect of Embodiments

As explained above, according to the automatic driving vehicle in the embodiment described above, the user who is getting in the automatic driving vehicle can give an instruction to the automatic driving vehicle when to get out from the automatic driving vehicle as occasion may demand in accordance with his or her action mode and/or action objective after getting out from the automatic driving vehicle. This is very convenient. For example, by setting up a behavior after getting out from the automatic driving vehicle to the automatic driving vehicle when the user gets in the automatic driving vehicle and goes back to his or her home, it is possible to easily move the automatic driving vehicle to a parking place that is located far away from his or her home by means of the automatic driving mode.

Further, according to the embodiment described above, there is a merit in which even in a case where the user gets in the automatic driving vehicle again, it is possible to cause the automatic driving vehicle to move to a place hoped by the user other than the getting-off location by means of a setup of the behavior after getting out from the automatic driving vehicle, and this makes it possible for the user to get in the automatic driving vehicle again at an appropriate location in accordance with an action of the user.

Further, the automatic driving vehicle according to the embodiment described above can carry out authentication for the re-enter-passenger using the information for authentication for the re-enter-passenger, which is stored in advance, when the user gets in the automatic driving vehicle again. Therefore, it is possible to prevent a situation in which other person gets in and uses the automatic driving vehicle.

Further, according to the automatic driving vehicle in the embodiment described above, the user is allowed to call the automatic driving vehicle using the communication means. Therefore, the user designates an arbitrary place other than the getting-off location to call the automatic driving vehicle, whereby the user can get in the automatic driving vehicle again at the arbitrary place, and it is very convenient. In addition, since the authentication for the caller is carried out, it is possible to prevent a situation in which unauthorized other person calls and uses the automatic driving vehicle.

Further, as described above, there is an advantage that the automatic driving vehicle according to this invention can be used not only as application for a personal vehicle, but also as application for a business-use truck.

Other Embodiments or Modified Examples

In the embodiment described above, a control to switch from the manual driving mode to the automatic driving mode is carried out on the basis of a selection operation input through the touch panel 112 by the driver. A control to switch from the automatic driving mode to the manual driving mode is carried out on the basis of the selection operation input through the touch panel 112, the accelerator pedal operation, the brake pedal operation, the shift lever operation or the steering operation. However, these switching controls can be carried out automatically. For example, in a case where the automatic driving vehicle detects that the automatic driving vehicle enters a highway by means of the car-navi system of the automatic driving vehicle or the GPS, the automatic driving vehicle can set the driving mode to the automatic driving mode automatically. To the contrary, when the automatic driving vehicle goes out from the highway to a general road, it is possible to switch the driving mode to the manual driving mode. In a case where an area available for the automatic driving is defined, the automatic driving vehicle determines whether the automatic driving vehicle travels in the area or not by means of the car-navi system of the automatic driving vehicle or the GPS. In a case where the automatic driving vehicle travels in the area, the driving mode may be switched to the automatic driving mode. In a case where the automatic driving vehicle travels outside the area, the driving mode may be switched to the manual driving mode.

In this regard, an emergency response mode may be provided in the switching between the manual driving mode and the automatic driving mode. In a case where a failure unexpectedly occurs in the automatic driving mode, for example, by pressing an emergency response button (not shown in the drawings), or by preparing a menu for an emergency response on the touch panel 112 and carrying out a touch operation to it, the automatic driving mode is released, whereby the automatic driving vehicle reduces speed thereof rapidly, and stops at a side strip. Further, in a case where the automatic driving vehicle recognizes from a camera image that a traffic accident occurs due to a doze or scattering of attention during the manual driving, the automatic driving mode urgently avoids such a traffic accident by means of an automatic brake function and/or an automatic steering operation, for example.

Further, in the embodiment described above, the automatic driving vehicle provided with both of the automatic driving mode and the manual driving mode has been explained as an example. However, even though the automatic driving vehicle is not an automatic driving vehicle that is not provided with the manual driving mode, this invention can be configured. In this case, the automatic driving vehicle always carries out the automatic driving mode. For this reason, the control to switch from the manual driving mode to the automatic driving mode and the control to switch from the automatic driving mode to the manual driving mode are not required, whereby the manual/automatic driving mode switching control unit 105 and the manual driving operation detecting unit 133 are unnecessary. Alternatively, an automatic driving control unit (not shown in the drawings) that carries out control processing for the automatic driving is provided. Further, an accelerator pedal, a brake pedal, a shift lever, steering (or a handle) and the like required for the manual driving are not required. However, in order to ensure safety, the automatic brake function may be provided with a brake pedal (which may be a brake button, an input of the touch panel or an input of a voice regarding braking), and only a brake operation can be treated manually by the driver. Further, even in the automatic driving, a traveling speed may be designated or adjusted manually by means of a button input, a touch panel input, a voice input or the like (for example, faster by 5 km per hour, or slower by 5 km per hour).

In the embodiment described above, it has been explained a case where the wireless communication unit uses the mobile phone network. However, the wireless communication unit is not limited thereto, and may be other communication system such as Wi-Fi (Wireless Fidelity (registered trademark)) and WiMAX (Worldwide Interoperability for Microwave Access). In a case where the wireless communication unit is configured by any of these communication systems, the embodiment described above can be achieved without the mobile phone function. Therefore, the mobile phone terminal may be a mobile terminal such as a tablet having no mobile phone function.

In this regard, the mobile phone terminal or the mobile terminal is not limited to the smartphone or the tablet. They may be a wrist watch type terminal, a glasses type terminal, a cloth type terminal, a ring type terminal, a notebook PC, or the like. In the embodiment described above, as the information for authentication of the re-enter-passenger, the face image of the get-out person, the password and/or the ID, which are defined in advance, are used, the user may select and set up whether to use the face image of the get-out person or the password and the ID as the information for authentication of the re-enter-passenger. Further, with respect to the information for authentication of the caller, the user can also select and set up what is to be used at the time of getting out from the automatic driving vehicle 1.

In this regard, the case where the driver gets out from the automatic driving vehicle 1 has been explained in the embodiment described above. However, even in a case where a passenger and no driver exist in the automatic driving vehicle 1 and not driver but the passenger gets out from the automatic driving vehicle 1 from a state that the automatic driving vehicle 1 is in autonomous traveling, the similar processing operation can be carried out. In such a case, the passenger other than the driver carries out the setup for the behavior after getting out from the automatic driving vehicle 1, and the re-enter-passenger is regarded as the passenger.

The example of the information for authentication for the caller, which is stored in the storing unit for the caller authentication, is not limited to the telephone number as described above. Biological information, such as a face image of the caller, a name, an address, the date of birth, an ID, a password, an e-mail address and the like of the caller can be used independently or in combination with plural subjects. The caller transmits this information for authentication to the automatic driving vehicle 1 from the mobile phone terminal through the mobile phone network. As the face image of the caller, ones photographed by the camera included in the mobile phone terminal can be used. As the other biological information for the caller, ones stored in a memory of the mobile phone terminal in advance can be used. Further, as the biological information such as the face image of the caller and information for caller authentication such as the name and the address, ones inputted by the caller can be used, or ones stored on a cloud of the Internet can also be used via the wireless communication unit 102.

Further, examples of the information for authentication of the user stored in the storing unit for the user authentication is not limited to the face image of the user as an example described above. For example, other biological information of the user such as a fingerprint, a voice, a vein, an iris or the like of the user can be used. Further, as the information for authentication of the user, in addition to the biological information of the user, the name, the address, the date of birth, the ID, the password, the telephone number, the e-mail address and the like may be used independently or in combination with plural subjects. As the biological information such as the face image of the user and the information for user authentication such as the name and the address, not only ones stored and held in the user authentication information storing unit 115 of the automatic driving vehicle 1 in advance can be used, but also ones inputted by the user can be used. Further, ones stored on a cloud of the Internet can also be used via the wireless communication unit 102.

Moreover, the car-navi database 134 is mounted in the automatic driving vehicle 1. However, a part or all of the database is not mounted in the automatic driving vehicle 1, but may be mounted on the cloud of the Internet. In this case, it can be used via the wireless communication unit 102. Further, a part or all of the process blocks of the car-navi functioning unit 113, the user authenticating unit 114, the caller authenticating unit 116, and the behavior control processing unit 120 is not mounted in the automatic driving vehicle 1, but it can be processed on the cloud via the wireless communication unit 102.

In this regard, it has not been mentioned cancelation of the behavior after getting out from the automatic driving vehicle 1 thus set up in the embodiment described above. However, cancelling means configured to receive cancellation of the behavior after getting out from the automatic driving vehicle 1, which is received by after-getting-out behavior setup receiving means may be provided in the automatic driving vehicle 1. However, in such a case, the automatic driving vehicle is provided with a registrant storing unit configured to receive and store registration of a person who has a right to cancel it in advance, and the cancelling means receives cancellation of the after-getting-out behavior only when a person who requests the cancellation is a registrant stored in the registrant storing unit.

Further, a case where the vehicle according to the embodiment described above is an electric vehicle has been explained, but the vehicle may be a gasoline-powered vehicle, a hybrid vehicle, a fuel-cell vehicle, or other drive system vehicle.

It should be noted that in the above embodiments the vehicle provided with four wheels has been explained, but the vehicle according to this invention includes a motorcycle, a motor tricycle and the like. Further, the vehicle according to this invention is not limited to a standard-size vehicle, a light vehicle, or a truck. For example, the vehicle may be a bus, a tractor, a dump truck, a power shovel, or a forklift. In addition, the vehicle may be a one-person vehicle, a motorized bicycle, electric-powered wheelchair or the like.

In this regard, the automatic driving vehicle according to this invention can be used as a vehicle that can be used temporarily (temporarily usable vehicle), such as a rented car, for example. When the user rents a vehicle as the automatic driving vehicle from a car-rental company that offers a rental car service, the user is registered as a temporary owner (that is, a driver). The number of users to be registered may be one person or more than one person. At the time of registration, biological information of the user such as a face image, a voice, a fingerprint, an iris or the like and/or an ID and a password, which are issued by the car-rental company, are stored in the user authentication information storing unit, and they are used as the information for user authentication. Further, a telephone number or an e-mail address of the mobile phone terminal of the user and/or an ID and a password, which are issued by the car-rental company, are stored in the caller authentication information storing unit, and they are used as the information for caller authentication. Then, the rented car can travel via one destination or a plurality of destinations (an objective place) in accordance with a purpose of the user such as sightseeing and a business. At the time of getting out from the rented car at each of the destinations, the user selects and inputs, from a screen, or inputs by a voice in an interactive manner the after-getting-out behavior, such as "wait here", "wait at an opposite side of a lake (sightseeing for a half around the lake)", "wait at an exit of a walking trail (stroll on the walking trail)", "wait at a parking place of a hotel for one night (lodgment in the hotel)", "wait at a parking place of an XX company (a meeting at the XX company)", "lunch at restaurant", or the like, in the after-getting-out behavior setup receiving means. These after-getting-out behaviors can be prepared by the car-rental company in accordance with an intended use such as sightseeing and a business.

The user can use the information for user authentication at the time of registration as the information for authentication at the time of getting in the automatic driving vehicle 1 again. There is no need to register biological information or the like of the user again at the time of getting out from the automatic driving vehicle 1.

Further, during usage of the rented car, face authentication for the user may be carried out on the basis of a face image photographed by the camera all the time or every predetermined time (for example, three minutes) while getting in the rented car, whereby the user is recognized as an allowable user. In a case where a person other than the user uses this rented car, the face authentication is not OK. For this reason, a trouble such as theft is detected, and the rented car makes contact with the user who is a temporary owner and the car-rental company by using a communication function such as the mobile phone terminal function mounted in the rented car. Further, the rented car may report the trouble to the police.

When the usage of the rented car by the user is terminated, the user gets out from the rented car, and inputs "return" into the after-getting-out behavior setup receiving means of the automatic driving vehicle as the rented car. In this regard, a button dedicated for return may be provided in the automatic driving vehicle as the rented car, or a return display may be provided intelligibly on the touch panel. Thus, the user can input "return" easily, and this makes it possible to improve convenience. When the "return" is received, the automatic driving vehicle as the rented car searches the nearest parking place of the car-rental company thereof as a place for return, and carries out autonomous traveling and moves to it in an unmanned manner (the automatic driving). Alternatively, the automatic driving vehicle as the rented car carries out autonomous traveling and moves to a place for return, which is designated in advance, in an unmanned manner (the automatic driving). A charge for the rented car, including used electricity charges (a gasoline expense in case of a gasoline-powered vehicle), is calculated at the time of termination of the usage or after termination of movement, and is settled by a credit card, a debit card or the like registered by the user at the time of rental of the rented car. In a case where the rented car is equipped with an electronic money settlement function, the user can settle (or pay) it by electronic money. In a case where the rented car is equipped with a prepaid card settlement function, the user can settle (or pay) it by a prepaid card. Further, advance payment at the time of rental may be used for hourly rental, one day rental, several days rental, or the like. Further, an ETC (Electronic Toll Collection System) card can also be used. In this regard, after the rented car is returned, the information for user authentication and the information for caller authentication of the user as the temporary owner is reset (and deleted), the user is not allowed to get in the rented car again.

Normally, a rented car cannot be returned so long as the rented car goes to the car-rental company that is placed around an airport or a station. However, the rented car as the automatic driving vehicle according to this invention can be dropped off anywhere at an opportune time of the user. This is very convenient. For example, in a case where a departure time of a train or an airplane is pressing, there is no need for the user to go to the car-rental company. The user can get out from the rented car at an entrance (or a traffic circle) of the station or the airport, and jump on a train or check in an airplane. In a case where the after-getting-out behavior is set to the behavior "return", the ted car carries out the autonomous traveling (the automatic driving) in an unmanned manner, and returns to a predetermined place for return such as the nearest parking place of the car-rental company.

In this regard, in a case where an exclusive road or a dedicated lane for the autonomous traveling (the automatic driving) is provided (or developed) in the vicinity of a station or an airport and there is a place for return in a development area, the rented car as the automatic driving vehicle according to this invention carries out autonomous traveling in an unmanned manner (the automatic driving) and moves to the place for return extremely smoothly after the user gets out from the rented car in order to return it. Thus, the return can be completed easily.

Of course, the rented car that is the automatic driving vehicle according to this invention may be an automatic driving vehicle provided with both of the automatic driving mode and the manual driving mode, or an automatic driving vehicle provided without the manual driving mode.

Further, this invention can also be applied to car sharing. In the car sharing, members who jointly uses an automatic driving vehicle are registered as users for the automatic driving vehicle (shared car). At the time of registration, biological information of the user such as a face image, a voice, a fingerprint, an iris or the like of each of the members and/or an ID and a password, which are issued by a car sharing company, are stored in the user authentication information storing unit, and they are used as the information for user authentication. Further, a telephone number or an e-mail address of a mobile phone terminal of each of the members and/or an ID and a password, which are issued by the car sharing company, are stored in the caller authentication information storing unit, and they are used as the information for caller authentication. When the shared car is actually used, the member can exclusively use the shared car on the basis of information for user authentication and information for caller authentication, in which the member is registered as a temporarily owned user, whereby the member freely uses the shared car. Even though the member owns a vehicle (or car), the member can set up the after-getting-out behavior in accordance with his or her purpose of use as occasion may demand. Therefore, the member is allowed to deal with (or use) the shared car like a vehicle owned by the member, and this is very useful.

When usage of the shared car by the user who is a member is terminated, the user gets out from the shared car, and inputs a behavior "usage termination" or simply "termination" into the shared car through the after-getting-out behavior setup receiving means. In this regard, a button dedicated for (usage) termination may be provided in the automatic driving vehicle as the shared car, or a (usage) termination display may be provided intelligibly on the touch panel. Thus, the user can input the behavior "(usage) termination" easily, and this makes it possible to improve convenience thereof. When the automatic driving vehicle as the shared car receives the behavior "(usage) termination", the automatic driving vehicle carries out the autonomous traveling (the automatic driving) in an unmanned manner to move to a predetermined parking place for the shared car or a place where a next user calls. In this regard, the information for user authentication and the information for caller authentication of the user as the temporarily owned user are reset (or deleted) after termination of the usage, and the user is not allowed to get in the automatic driving vehicle again. In a case where the user hopes to get in the automatic driving vehicle again, the user is required to carry out a usage request for the shared car again.

Moreover, this invention can be applied to a taxi or limousine that carries out autonomous traveling (or automatic driving) in an unmanned manner. The taxi or limousine is provided by a taxi company and/or a limousine service company. The taxi or limousine does not have the manual driving mode. Alternatively, even though the taxi or limousine has the manual driving mode, a user is not allowed to switch from the automatic driving mode to the manual driving mode. When the user gets in the taxi or limousine, the taxi or limousine causes the user to input his or her personal information such as biological information, or to issue a one-time password. This is stored in a predetermined storing unit as information for user authentication and information for caller authentication. When the user gets out from the taxi or limousine, the user is allowed to input an after-getting-out behavior to the after-getting-out behavior setup receiving means. At the time of calling or at the time of getting in the taxi or limousine again, the information for user authentication and the information for caller authentication, which were stored when the user gets in it, are used for authentication. Since the user can stop over (get out therefrom on the way) on the basis of his or her schedule, it is very convenient. When usage of the taxi or limousine is terminated, the user gets out from the taxi or limousine, and inputs a behavior "usage termination" or simply "termination" into the taxi or limousine through the after-getting-out behavior setup receiving means. In this regard, a button dedicated for (usage) termination may be provided in the taxi or the limousine, or a (usage) termination display may be provided intelligibly on the touch panel. Thus, the user can input the behavior "(usage) termination" easily, and this makes it possible to improve convenience thereof. When the taxi or limousine receives the behavior "(usage) termination", the taxi or limousine searches the nearest parking place of the taxi company or the limousine service company as a place at the time of usage termination, and carries out autonomous traveling (the automatic driving) in an unmanned manner to move to the place. Alternatively, the taxi or limousine carries out autonomous traveling (the automatic driving) in an unmanned manner to move to a place where a next passenger (or user) designated in advance waits. In this regard, the taxi may search the nearest taxi stand as the place at the time of usage termination, carry out autonomous traveling (the automatic driving) in an unmanned manner to move to the nearest taxi stand, and wait for getting in the taxi of a next passenger (or user). Further, the limousine may search the nearest limousine stand as the place at the time of usage termination, carry out autonomous traveling (the automatic driving) in an unmanned manner to move to the nearest limousine stand, and wait for getting in the limousine of a next passenger (or user).

In a case where the taxi or limousine is equipped with an electronic money settlement function or a prepaid card settlement function, the user can pay a usage charge (or passenger fare) by means of electronic money or a prepaid card when to get out from the taxi or limousine. Further, in a case where the taxi or limousine is equipped with a reader for a credit card and/or a debit card, the user registers a credit card number or a debit card number of the user at the time of getting in the taxi or limousine, whereby the user can settle (or pay) the usage charge (or passenger fare) automatically from the credit card or debit card at the time of getting out from the taxi or limousine. Further, advance payment at the time of getting in the taxi or limousine may be used as a fixed charge per usage of a predetermined time (for example, 1,000 yen within 10 minutes) or a fixed charge per usage of a predetermined distance (for example, 1,000 yen within one kilometer). The advance payment may be carried out by the electronic money or the prepaid card. In a case where the taxi or limousine is equipped with a cash storing machine, cash payment is available. In case of the cash payment, the change may not be available for the sake of ease, or only a coin (for example, only 500 yen coin) may be received. Further, an ETC card can be used. In this regard, the information for user authentication and the information for caller authentication of the user are reset (or deleted) after termination of the usage (or completion of settlement), and the user is not allowed to get in the taxi or limousine again.

In this regard, in a case where an exclusive road or a dedicated lane for the autonomous traveling (the automatic driving) is provided (or developed) in the vicinity of a facility such as a competition venue or an Athlete's village for Olympics or the FIFA World Cup of football, or is provided inside the grounds of a large facility such as an amusement park, the taxi or limousine as the automatic driving vehicle according to this invention can freely get a passenger (the user) off within a development area, carry out autonomous traveling (the automatic driving) in an unmanned manner to move to the taxi stand or limousine stand, which are placed within the development area, extremely smoothly after usage termination, and wait for a next passenger effectively.

Further, a new service can be carried out in which many automatic driving vehicles dedicated to move within the development area are arranged within the development area described above, and the user is allowed to freely use it for a fee or for free anytime, anywhere if any automatic driving vehicle is not used. It is not necessary for the user to worry about moving means in this service so long as the user is positioned within the development area. Thus, it is very convenient. In this case, an ultra-small vehicle, such as a single passenger vehicle or a two-seater vehicle, becomes very useful moving means and transporting means in view of space utilization.

EXPLANATION OF SYMBOLS

1: automatic driving vehicle
2: user
10: electronic control circuit unit
107: group of cameras
108: group of sensors
110: current location detecting unit
111: display unit
112: touch panel
113: car-navi functioning unit
114: user authenticating unit
115: user authentication information storing unit
116: caller authenticating unit
117: caller authentication information storing unit
118: after-getting-out behavior setup receiving unit
119: after-getting-out behavior storing unit
120: behavior control processing unit
121: timer circuit
122: audio input/output unit
135: microphone
136: speaker

What is claimed is:

1. A controller for an automatic driving vehicle, the automatic driving vehicle including an automatic driving mode in which autonomous traveling is carried out, the controller comprising:
　a control circuit; and
　a memory including a set of executable instructions, that when executed by the control circuit, causes the control circuit to perform operations including:
　　receiving information for estimating a setup for a destination and a time, the information being input by a driver or a user when the driver or the user gets out of the automatic driving vehicle; and
　　controlling the automatic driving vehicle to move to the destination on a basis of the destination and the time.

2. The controller according to claim 1, wherein the setup for the destination is determined as a getting-off location, when the setup of the destination cannot be estimated from the information while the driver or the user that gets out of the automatic driving vehicle does not set up the destination.

3. The controller according to claim 2, wherein, when the destination is determined as the getting-off location, the driver or the user getting out of the automatic driving vehicle at the getting-off location, the automatic driving vehicle is controlled to return to the getting-off location in the controlling.

4. The controller according to claim 3, wherein the setup includes a time period, and
in the controlling, the automatic driving vehicle is controlled to go to the destination after an elapse of the time period from when the driver or the user gets out of the automatic driving vehicle.

5. The controller according to claim 4, wherein the setup includes a specific time, and
in the controlling, the automatic driving vehicle is controlled to go to the destination at the specific time.

6. The controller according to claim 5, wherein
in the receiving, the information includes a voice input, and
the operations further include:
determining the time from the voice input.

7. The controller according to claim 6, wherein
the voice input includes an event, and
in the determining, the time is determined based on the event.

8. The controller according to claim 7, wherein, in the determining, the time is determined based on a termination time of the event.

9. The controller according to claim 8, wherein
the operations further include:
obtaining a broadcast of the event, and
the termination time of the event is determined from the broadcast of the event.

10. The controller according to claim 9, wherein, in the obtaining, the broadcast is obtained from a site via the Internet.

11. The controller according to claim 7, wherein the operations further include:
changing the time based on a progress of the event.

12. The controller according to claim 7, wherein, in the determining, the time is determined based on a type of the event and an approximate time associated with the type of the event.

13. The controller according to claim 12, wherein, in the determining, the approximate time associated with the type of the event is a sum of plural approximate times, each of the plural approximate times being associated with a specific portion of the event.

14. The controller according to claim 7, wherein, in the determining, the time is further determined based on a state of the driver or the user, the state of the driver or the user being determined based on the event.

15. The controller according to claim 7, wherein, in the determining, the time is further determined based on a presence or an absence of parking at the getting-off location.

16. The controller according to claim 4, wherein
in the receiving, the information includes a voice input, and
the operations further include:
determining the time from the voice input.

17. The controller according to claim 3, wherein the setup includes a specific time, and
in the controlling, the automatic driving vehicle is controlled to go to the destination at the specific time.

18. The controller according to claim 3, wherein
in the receiving, the information includes a voice input, and
the operations further include:
determining the time from the voice input.

19. The controller according to claim 2, wherein the setup includes a time period, and
in the controlling, the automatic driving vehicle is controlled to go to the destination after an elapse of the time period from when the driver or the user gets out of the automatic driving vehicle.

20. The controller according to claim 2, wherein the setup includes a specific time, and
in the controlling, the automatic driving vehicle is controlled to go to the destination at the specific time.

21. The controller according to claim 2, wherein
in the receiving, the information includes a voice input, and
the operations further include:
determining the time from the voice input.

22. The controller according to claim 2, wherein
in the receiving, the information includes a selection of an errand from a list of predetermined errands, and
the operations further include:
determining the time based on the selection of the errand.

23. The controller according to claim 22, wherein each of the predetermined errands in the list is associated with a predetermined time.

24. The controller according to claim 23, wherein, in the determining, the time is further determined based on at least one of a state of the driver or the user or a presence or an absence of parking at the getting-off location.

25. The controller according to claim 1, wherein the setup includes a time period, and
in the controlling, the automatic driving vehicle is controlled to go to the destination after an elapse of the time period from when the driver or the user gets out of the automatic driving vehicle.

26. The controller according to claim 1, wherein the setup includes a specific time, and
in the controlling, the automatic driving vehicle is controlled to go to the destination at the specific time.

27. The controller according to claim 1, wherein
in the receiving, the information includes a voice input, and
the operations further include:
determining the time from the voice input.

28. The controller according to claim 1, wherein
in the receiving, the information includes a selection of an errand from a list of predetermined errands, and
the operations further include:
determining the time based on the selection of the errand.

29. The controller according to claim 28, wherein each of the predetermined errands in the list is associated with a predetermined time.

30. An automatic driving vehicle including an automatic driving mode in which autonomous traveling is carried out, the automatic driving vehicle comprising:
a control circuit; and
a memory including a set of executable instructions, that when executed by the control circuit, causes the control circuit to perform operations including:
receiving information for estimating a setup for a destination and a time, the information being input by a driver or a user when the driver or the user gets out of the automatic driving vehicle; and
controlling the automatic driving vehicle to move to the destination on a basis of the destination and the time.

31. A non-transitory computer-readable medium containing a program for an automatic driving vehicle, the automatic driving vehicle including an automatic driving mode in which autonomous traveling is carried out, the automatic driving vehicle including a computer, the program causing the computer to perform operations including:

receiving information for estimating a setup for a destination and a time, the information being input by a driver or a user when the driver or the user gets out of the automatic driving vehicle; and controlling the automatic driving vehicle to move to the destination on a basis of the destination and the time.

* * * * *